United States Patent
Matsumoto et al.

(10) Patent No.: US 10,563,081 B2
(45) Date of Patent: Feb. 18, 2020

(54) INK COMPOSITION FOR INK-JET RECORDING, INK-SET FOR INK-JET RECORDING, INK CARTRIDGE, AND METHOD FOR PRODUCING PRINTING

(71) Applicant: DNP FINE CHEMICALS CO., LTD., Yokohama-shi, Kanagawa (JP)

(72) Inventors: Kisei Matsumoto, Yokohama (JP); Naoki Shiraishi, Yokohama (JP); Kentaro Otomo, Yokohama (JP); Fumie Yamazaki, Yokohama (JP); Yukio Sugita, Yokohama (JP)

(73) Assignee: DNP Fine Chemicals Co., LTD., Yokohama-shi (JP)

( * ) Notice: Subject to any disclaimer, the term of this patent is extended or adjusted under 35 U.S.C. 154(b) by 0 days.

(21) Appl. No.: 16/087,912

(22) PCT Filed: Nov. 8, 2016

(86) PCT No.: PCT/JP2016/083092
§ 371 (c)(1),
(2) Date: May 20, 2019

(87) PCT Pub. No.: WO2017/168817
PCT Pub. Date: Oct. 5, 2017

(65) Prior Publication Data
US 2019/0292395 A1   Sep. 26, 2019

(30) Foreign Application Priority Data

Mar. 31, 2016   (JP) ................ 2016-072858

(51) Int. Cl.
| | | |
|---|---|---|
| C09D 11/54 | (2014.01) |
| B41J 2/175 | (2006.01) |
| B41M 5/00 | (2006.01) |
| C09D 11/023 | (2014.01) |
| C09D 11/033 | (2014.01) |
| C09D 11/037 | (2014.01) |
| C09D 11/102 | (2014.01) |
| C09D 11/322 | (2014.01) |
| C09D 11/40 | (2014.01) |
| C09D 11/30 | (2014.01) |

(52) U.S. Cl.
CPC .......... *C09D 11/54* (2013.01); *B41J 2/17503* (2013.01); *B41M 5/00* (2013.01); *B41M 5/0023* (2013.01); *C09D 11/023* (2013.01); *C09D 11/033* (2013.01); *C09D 11/037* (2013.01); *C09D 11/102* (2013.01); *C09D 11/30* (2013.01); *C09D 11/322* (2013.01); *C09D 11/40* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 2003/0097960 A1 | 5/2003 | Ito et al. | |
| 2004/0046842 A1 | 3/2004 | Rhee | |
| 2004/0249018 A1* | 12/2004 | Kataoka | C09D 11/30 106/31.61 |
| 2005/0075449 A1 | 4/2005 | Kubota | |
| 2009/0289973 A1* | 11/2009 | Makuta | B41M 5/0017 347/100 |
| 2013/0065028 A1 | 3/2013 | Fujii et al. | |
| 2013/0202861 A1* | 8/2013 | Ohta | B41J 2/2107 347/100 |
| 2014/0055520 A1 | 2/2014 | Inumaru et al. | |
| 2014/0232782 A1* | 8/2014 | Mukai | B41J 2/2107 347/20 |
| 2015/0275002 A1 | 10/2015 | Miyazawa | |
| 2016/0319141 A1* | 11/2016 | Sugita | B41J 2/01 |

FOREIGN PATENT DOCUMENTS

| | | |
|---|---|---|
| JP | 09-087586 A | 3/1997 |
| JP | 2001-354888 A | 12/2001 |

(Continued)

OTHER PUBLICATIONS

International Search Report dated Dec. 6, 2016; PCT/JP2016/083092.

*Primary Examiner* — Manish S Shah
(74) *Attorney, Agent, or Firm* — Ladas & Parry LLP

(57) ABSTRACT

A main object of the present invention is to provide an ink composition for ink-jet recording capable of forming an ink film excellent in both film strength and scratch resistance. The present invention achieves the object by providing an ink composition for ink-jet recording comprising: an aqueous solvent including water and water-soluble organic solvent; a coloring agent; a resin emulsion; and a surfactant; wherein the resin emulsion includes a silicon-acrylic resin emulsion and a resin emulsion other than the silicon-acrylic resin emulsion; a content ratio of the resin emulsion to the coloring agent (content of the resin emulsion/content of the coloring agent) is 1/5 or more and 15/1 or less; and a content ratio of the silicon-acrylic resin emulsion to the coloring agent (content of the silicon-acrylic resin emulsion/content of the coloring agent) is 1/20 or more and 5/1 or less.

8 Claims, No Drawings

(56) References Cited

FOREIGN PATENT DOCUMENTS

| | | |
|---|---|---|
| JP | 2003-192964 A | 7/2003 |
| JP | 2004-210996 A | 7/2004 |
| JP | 2005-518974 A | 6/2005 |
| JP | 2010-047727 A | 3/2010 |
| JP | 2012-051357 A | 3/2012 |
| JP | 2013-076062 A | 4/2013 |
| JP | 2013-144774 A | 7/2013 |
| JP | 2013-189597 A | 9/2013 |
| JP | 2014-189777 A | 10/2014 |
| JP | 2015-124379 A | 7/2015 |
| JP | 2015-193824 A | 11/2015 |
| JP | 2016-027167 A | 2/2016 |

* cited by examiner

INK COMPOSITION FOR INK-JET RECORDING, INK-SET FOR INK-JET RECORDING, INK CARTRIDGE, AND METHOD FOR PRODUCING PRINTING

TECHNICAL FIELD

The present invention relates to an ink-jet composition for ink-jet recording capable of forming an ink film excellent in both film strength and scratch resistance.

BACKGROUND ART

Conventionally, an aqueous ink used in the printing field is mainly designed to target an absorbent substrate such as paper and synthetic paper, such as in Patent Documents 1 to 3.

Such an aqueous ink is high in hydrophobicity, and it has been difficult to satisfy the printing quality required to unabsorbent plastic substrate such as polyethylene terephthalate (PET) and a vinyl chloride resin in the market; thus, a solvent ink and an UV-cured type ink has been often used.

However, in recent years, demanded printing technique is to directly write to various unabsorbent substrates used in industrial application by using an aqueous ink that has small influence to the environment and is highly safe to workers.

To this kind of requirement, such as in Patent Document 4, an aqueous ink including resin emulsion has been developed for the usage in the sign graphic field inside and outside houses targeted to an unabsorbent substrate such as vinyl chloride not conventionally used.

CITATION LIST

Patent Literatures

Patent Document 1: Japanese Patent Application Laid-Open (JP-A) No. 2003-192964
Patent Document 2: JP-A No. 2004-210996
Patent Document 3: JP-A No. 2001-354888
Patent Document 4: JP-A No. 2013-189597

SUMMARY OF INVENTION

Technical Problem

In the unabsorbent substrate, an ink film is positioned on the surface of the substrate; thus, properties in film strength such as adhesiveness, solvent resistance, abrasion resistance, of those quality higher than when an absorbent substrate is used, are required, and furthermore, properties such as scratch resistance is required.

However, when the surface of the unabsorbent substrate was printed with the aqueous ink such as in Patent Document 4, there has been problem that the above described properties such as film strength and scratch resistance of the ink film have been insufficient.

The present invention has been made in view of the above problem, and a main object thereof is to provide an ink composition for ink-jet recording capable of forming an ink film excellent in both film strength and scratch resistance.

Solution to Problem

Researches have been thoroughly made to solve the problem, and as the result, it has been found out that the ink film excellent in both film strength and scratch resistant can be formed by using a silicon-acrylic resin emulsion in addition to a resin emulsion such as an acrylic resin emulsion, together as the resin emulsion in the ink composition, and further by setting the content of the resin emulsion ad the silicon-acrylic resin emulsion to be in the specific range; thereby, the present invention has been completed.

Thus, the present invention provides an ink composition for ink-jet recording characterized by comprising: an aqueous solvent including water and water-soluble organic solvent; a coloring agent; a resin emulsion; and a surfactant; wherein the resin emulsion includes a silicon-acrylic resin emulsion and a resin emulsion other than the silicon-acrylic resin emulsion (hereinafter referred to as a second resin emulsion in some cases); a content ratio of the resin emulsion to the coloring agent (content of the resin emulsion/content of the coloring agent) is 1/5 or more and 15/1 or less; and a content ratio of the silicon-acrylic resin emulsion to the coloring agent (content of the silicon-acrylic resin emulsion/content of the coloring agent) is 1/20 or more and 5/1 or less.

According to the present invention, both the silicon-acrylic resin emulsion and the second emulsion are included as the resin emulsion, and the content of these are in the specific range, and thus an ink film excellent in both film strength such as adhesiveness, solvent resistance, abrasion resistance, and water resistance, and scratch resistance, can be formed.

In the present invention, the second resin emulsion preferably includes at least one kind of an acrylic resin, an urethane resin, an urethane-acrylic resin, a polyester resin, an acrylic polyester resin, a styrene acrylic resin, and an acrylic-vinyl chloride resin. The reason therefor is to allow the ink composition for ink-jet recording (hereinafter just referred to as an ink composition in some cases) to be capable of forming an ink film excellent in both film strength and scratch resistance.

In the present invention, it is preferable that the water-soluble organic solvent includes alkanediols. The reason therefor is to allow the ink composition to be excellent in dispersion stability of the resin emulsion.

The present invention provides an ink-set for ink-jet recording characterized by comprising: the above described ink composition for ink-jet recording; and a receiving solution containing a multivalent metal salt.

According to the present invention, the above described ink composition for ink-jet recording is included so as to obtain a printing excellent in both film strength and scratch resistance, and further excellent in image clarity.

The present invention provides an ink cartridge characterized by comprising: a container for ink; and an ink composition stored in the container for ink; wherein the ink composition is the above described ink composition for ink-jet recording.

According to the present invention, the above described ink composition for ink-jet recording is included as the ink composition, so as to obtain a printing excellent in both film strength and scratch resistance.

The present invention provides a method for producing a printing characterized by comprising a printing step of ejecting the above described ink composition for ink-jet recording by an ink-jet method.

According to the present invention, the above described ink composition for ink-jet recording is used in the printing step, so as to obtain a printing excellent in both film strength and scratch resistance.

Advantageous Effects of Invention

The present invention exhibits effects such as providing the ink composition for ink-jet recording capable of forming an ink film excellent in both film strength and scratch resistance.

DESCRIPTION OF EMBODIMENTS

The present invention relates to an ink composition for ink-jet recording, an ink-set for ink-jet recording, an ink cartridge, and a method for producing a printing, using the ink composition.

The ink composition for ink-jet recording, the ink-set for ink-jet recording, the ink cartridge and the method for producing a printing of the present invention are hereinafter explained.

A. Ink Composition for Ink-Jet Recording

First, the ink composition for ink-jet recording of the present invention is explained.

The ink composition for ink-jet recording of the present invention is characterized by comprising: an aqueous solvent including water and water-soluble organic solvent; a coloring agent; a resin emulsion; and a surfactant; wherein the resin emulsion includes a silicon-acrylic resin emulsion and a resin emulsion other than the silicon-acrylic resin emulsion; a content ratio of the resin emulsion to the coloring agent (content of the resin emulsion/content of the coloring agent) is 1/5 or more and 15/1 or less; and a content ratio of the silicon-acrylic resin emulsion to the coloring agent (content of the silicon-acrylic resin emulsion/content of the coloring agent) is 1/20 or more and 5/1 or less.

Here, to obtain excellent scratch resistance with just the resin emulsion other than the silicon-acrylic resin emulsion conventionally used as the resin emulsion, addition of large quantity thereof is required; the problem arises therefrom is that ejecting the ink-jet may be difficult in some cases.

Meanwhile, when just the silicon-acrylic resin emulsion is used as the resin emulsion, scratch resistance may be improved, but there is a problem that the film strength such as adhesiveness, solvent resistance, abrasion resistance, and water resistance may be insufficient in some cases.

To solve the problems, according to the present invention, both the silicon-acrylic resin emulsion and the second resin emulsion are included as the resin emulsion, and further, the content thereof are set to be in the specific range, so as to secure the ink-jet ejection properties and to achieve both the scratch resistance and the film strength such as adhesiveness, solvent resistance, abrasion resistance, and water resistance.

Here, although it is not clear, but the reasons why an ink film excellent in both film strength and scratch resistance can be formed by setting the content of both the silicon-acrylic emulsion and the second resin emulsion, as the resin emulsion, to be in the specific range are presumed as follows:

In the ink composition for ink-jet recording of the present embodiment, the resin emulsion is the one in which a continuous phase is an aqueous solvent, and substances such as a resin included in the resin emulsion are dispersed in the aqueous solvent as fine particles. The resin can be dispersed in the ink composition for ink-jet recording by electrostatic repulsion and solid repulsion when the resin emulsion is formed. The resin emulsion has a characteristic of increasing viscosity and aggregating when the aqueous solvent which is generally continuous phase is decreased by factors such as evaporation and permeation; it has an effect of promoting fixation of coloring agents to a recording medium. The ink film presumably becomes excellent in the films strength thereby. Also, the resin is included in the ink composition as an emulsion so as to allow the ink-jet ejection properties to be excellent.

Also, inclusion of the second resin emulsion other than the silicon-acrylic resin emulsion allows the ink composition to form an ink film excellent in film strength such as adhesiveness, solvent resistance, abrasion resistance, and water resistance to not only the absorbent substrate but also to the unabsorbent substrate.

Also, the silicon-acrylic resin included in the silicon-acrylic resin emulsion includes a polysiloxane structure, and the surface free energy is low; thus, when the ink composition film is formed by ink-jet ejecting the ink composition, there is a tendency the composition is likely to gather on the surface of the ink composition film. Accordingly, inclusion of the silicon-acrylic resin emulsion allows the ink composition to form an ink film with high content in the silicon-acrylic resin on the surface after the aqueous solvent of the ink composition film is dried and removed. Then, it is presumed that sliding property is given to the surface of such an ink film. Thus, for example, even when materials such as a nail of the user using the printing touches the ink film, materials such as a nail is prevented from getting caught; scratch resistance becomes excellent. Also, the substance that becomes in an emulsion state is used as the silicon-acrylic resin, so as to form an ink film capable of stably exhibiting the sliding properties.

Further, the silicon-acrylic resin included in the silicon-acrylic resin emulsion is the one including a structure comprising (meth)acrylic resin monomer such as poly(meth)acrylate, so as to be excellent in compatibility with the resin other than the silicon-acrylic resin (hereinafter referred to as a second resin in some cases) included in the second resin emulsion. Thus, the ink composition becomes excellent in sliding properties, and capable of forming an ink film excellent in scratch resistance and film strength such as adhesiveness, solvent resistance, abrasion resistance, and water resistance.

Also, from the descriptions above, when the resin emulsion including neither the structure containing the structure comprising (meth)acrylic resin monomer nor polysiloxane structure in a same molecule, is used, the silicon-acrylic resin emulsion becomes more excellent in sustainability of the sliding properties; the ink film excellent in sustainability of scratch resistance can be formed compared to when, for example, just the silicon-based resin emulsion or the mixture of the silicon-based resin emulsion and the acrylic resin emulsion is used.

Furthermore, the content of the second resin emulsion and the silicon-acrylic resin emulsion is in the above described ratio, and thus the ink composition can stably form an ink film that has a region with high content ratio of the second resin in inner side of the ink film, and the region with high content ratio of the above described silicon-acrylic resin in surface side of the ink film, as well as excellent film strength and scratch resistance.

In this manner, both the silicon-acrylic resin emulsion and the second emulsion are included as the resin emulsion, and the content of the both is set to be in the specific range, so as to allow the ink composition to be capable of obtaining an ink film excellent in both film strength and scratch resistance.

The ink composition for ink-jet recording of the present invention includes an aqueous solvent, a coloring agent, a resin emulsion, and a surfactant.

Each component in the ink composition for ink-jet recording of the present invention is hereinafter explained in details.

1. Resin Emulsion

The resin emulsion includes the silicon-acrylic resin emulsion and a resin emulsion other than the silicon-acrylic resin emulsion.

The content ratio of the resin emulsion to the coloring agent (content of the resin emulsion/content of the coloring agent) is 1/5 or more and 15/1 or less.

Also, the content ratio of the silicon-acrylic resin emulsion to the coloring agent (content of the silicon-acrylic resin emulsion/content of the coloring agent) is 1/20 or more and 5/1 or less.

The lower limit of the content ratio of the resin emulsion to the coloring agent (content of the resin emulsion/content of the coloring agent) is 1/5 or more, preferably 1/3 or more, more preferably 1/2 or more, and particularly preferably 1/1 or more.

Also, the upper limit of the ratio is 15/1 or less, more preferably 12/1 or less, and particularly preferably 10/1 or less.

The upper limit and the lower limit of the ratio is in the above described range, so as to allow the ink composition to be capable of obtaining an ink film excellent in both film strength and scratch resistance.

Incidentally, hereinafter, the content ratio of the resin emulsion and the coloring agent, and the content ratio of the resin emulsions are indicated as the mass ratio.

Also, the content of the resin emulsion refers to the solid content of the resin emulsion; when just a resin is included as the resin emulsion, it refers to the content of the rein, and when the resin emulsion includes, for example, a resin and the other component such as an emulsifying agent, it refers to the total solid content of the resin and the other component.

The lower limit of content ratio of the silicon-acrylic resin emulsion to the coloring agent (content of the silicon-acrylic resin emulsion/content of the coloring agent) is 1/20 or more, more preferably 1/10 or more, and further preferably 1/8 or more.

Also, the upper limit of the ratio is 5/1 or less, more preferably 3/1 or less, and further preferably 2/1 or less.

The upper limit and the lower limit of the ratio are in the above described range, so as to allow the ink composition to be capable of obtaining an ink film excellent in both film strength and scratch resistance.

The content ratio of the silicon-acrylic resin emulsion to the second resin emulsion (content of silicon-acrylic resin emulsion/content of second resin emulsion) may be in the level that allows an ink film excellent in both film strength and scratch resistance to be obtained; for example, the lower limit thereof can be 1/50 or more, and above all, is more preferably 1/40 or more, and further preferably 1/20 or more.

Also, the upper limit of the ratio can be 1/1 or less, and above all, is further preferably 1/2 or less.

The upper limit and the lower limit of the ratio are in the above described range, so as to allow the ink composition to stably form an ink film that has a region with high content ratio of the second resin in inner side of the ink film and a region with high content ratio of the above described silicon-acrylic resin in surface side of the ink film.

(1) Silicon-acrylic Resin Emulsion

The silicon-acrylic resin emulsion includes a silicon-acrylic resin in an emulsion state inside the ink composition of the present invention.

Here, emulsion state refers to the state in which substances such as a resin included in the resin emulsion is dispersed as fine particles inside the ink composition.

Also, since the resin in emulsion state has a characteristic of increasing viscosity and aggregating when an aqueous solvent which is generally continuous phase is decreased by factors such as evaporation and permeation, it can promote the fixation of the coloring agent to a recording medium.

The silicon-acrylic resin is a copolymer comprising a repeated unit of (meth)acrylate (acrylic structural unit) and a repeated unit of siloxane represented by the below general formula (1) (siloxane-based structural unit) in the structure.

Examples of such a silicon-acrylic resin may include the one containing both an acrylic resin including the acrylic structural unit as the main component, and a polysiloxane-based resin having a polysiloxane structure as the main skeleton.

Incidentally, "(meth)acryl" means both "acryl" and "methacryl".

In more specific, the silicon-acrylic resin may be the one in which an acrylic resin and a polysiloxane-based resin are bonded by covalent bonding; examples thereof may include a silicon-acrylic block copolymer in which the edges of acrylic resin and polysiloxane-based resin are bonded, a silicon-acrylic graft copolymer in which the acrylic resin in bonded as a side chain to the main skeleton of polysiloxane-based resin, an acrylic-silicon-based graft copolymer in which the polysiloxane-based resin is bonded as a side chain to the main skeleton of acrylic resin, and the one in which these copolymers are bonded. The silicon-acrylic resin being the above described copolymer allows the ink composition to be capable of obtaining an ink film excellent in both film strength and scratch resistance.

Incidentally, the silicon-acrylic resin ma include just one kind, and may include a mixture of two kinds or more.

[Chemical Formula 1]

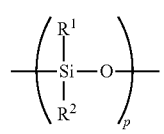

(1)

In the formula (1), $R^1$ and $R^2$ are each independently a hydrogen atom, an alkyl group and a phenyl group with 1 to 4 carbon atoms; plurality of $R^1$ and $R^2$ may be the same and may be different from each other. Also, p is an integer of 2 or more.

The acrylic resin includes the acrylic structural unit as a main component.

Here, included as a main component means to be included in the contents that is capable of giving silicon-acrylic resin compatibility with the second resin; in more specific, the content of the acrylic structural unit may be 50 mass % or more in the acrylic resin. In the present invention, the content of the acrylic structural unit in the acrylic resin is more preferably 75 mass % or more. The content being in the above described range allows the ink composition to be capable of obtaining an ink film excellent in both film strength and scratch resistance.

The acrylic structural unit is the one capable of forming an ink film having desired scratch resistance and film strength, and preferably includes a structural unit derived from (meth)acrylate monomer having neither an acid group nor a hydroxyl group, as a main component. The reason therefor is to allow the ink composition to be capable of obtaining an ink film excellent in both film strength and scratch resistance.

Here, included as a main component means to be included in the contents that is capable of giving the ink film both film strength and scratch resistance; in more specific, the content of the structural unit derived from (meth)acrylate monomer having neither an acid group nor a hydroxyl group in all the acrylic structural units may be 70 mass % or more, is more preferably 80 mass % or more, and further preferably 85 mass % or more. The content being in the above described range allows the ink composition to be capable of obtaining an ink film excellent in both film strength and scratch resistance.

Incidentally, the upper limit of the content may be appropriately set in a range with which the ink film having desired scratch resistance and film strength can be formed; the acrylic structural unit may include, 100 mass % of, which means just the structural unit derived from (meth)acrylate monomer having neither an acid group nor a hydroxyl group, and it may be, for example, 99.9 mass % or less.

As the (meth)acrylate monomer having neither an acid group nor a hydroxyl group, for example, the (meth)acrylate monomer having neither an acid group nor a hydroxyl group described in JP-A No. 2014-189777 can be used.

In the present invention, above all, the (meth)acrylate monomer is preferably a substance such as methyl(meth)acrylate, ethyl(meth)acrylate, propyl(meth)acrylate, butyl(meth)acrylate, pentyl(meth)acrylate, hexyl(meth)acrylate, 2-ethylhexyl(meth)acrylate, octyl(meth)acrylate, nonyl(meth)acrylate, dodecyl(meth)acrylate, stearyl(meth)acrylate, cyclopentyl(meth)acrylate, cyclohexyl(meth)acrylate, and 2-methylcyclohexyl(meth)acrylate. The (meth)acrylate monomer being the above described (meth)acrylate monomer allows the ink composition to be capable of obtaining an ink film excellent in both film strength and scratch resistance.

The acrylic structural unit may include an additional acrylate-based structural unit other than the structural unit derived from (meth)acrylate monomer having neither an acid group nor a hydroxyl group.

A monomer configured in such an additional acrylic structural unit may be polymerizable monomer that can be polymerized with the (meth)acrylate monomer having neither an acid group nor a hydroxyl group; examples thereof may include the acid-group-containing monomer such as a carboxyl-group-containing monomer having methyleny unsaturated double bond such as acrylic acid, methacrylic acid, itaconic acid, fumaric acid, and a carboxyl group, described in JP-A No. 2014-189777; an amide-group-containing monomer such as (meth)acrylamide, and a hydroxyl-group-containing monomer having a hydroxyl group such as 2-hydroxyethyl(meth)acrylate.

Also, the acrylic resin may include an additional structural unit other than the acrylic structural unit. Examples of the monomer that can constitute such an additional structural unit may include other monomers such as vinyl acetate and styrene described in JP-A No. 2014-189777.

The polysiloxane-based resin has a polysiloxane structure as a main skeleton.

A structural unit (siloxane structural unit) configured in the polysiloxane structure is, for example, preferably the one including the structural unit represented by the formula (1) as the main component. The polysiloxane-based resin including the structural unit as the main component allows the ink composition to be capable of obtaining an ink film excellent in both film strength and scratch resistance.

Here, included as the main component means to be included in the content capable of giving scratch resistance to the ink film; for example, 50 mass % or more of the structural unit represented by the formula (1) may be included in the polysiloxane-based resin. In the present invention, the content of the structural unit represented by the formula (1) in the polysiloxane-based resin is more preferably 75 mass % or more. The content being in the above described range allows the ink composition to be capable of obtaining an ink film excellent in both film strength and scratch resistance.

Incidentally, the upper limit of the content may be appropriately set in the range the ink film having desired scratch resistance and film strength can be formed; the polysiloxane-based resin may include, 100 mass % of, which means just the structural unit represented by the formula (1), and it may be, for example, 99.9 mass % or less.

There are no particular limitations on $R^1$ and $R^2$ in the formula (1), if they are respectively a hydrogen atom, an alkyl group and a phenyl group with 1 to 4 carbon atoms; among them, an alkyl group with 1 to 4 carbon atoms is preferable, and particularly preferable is a methyl group: it is preferable that the polysiloxane-based resin is a polydimethylpolysiloxane-based resin having polydimethylsiloxane as a main skeleton. The siloxane-based resin being in the structure allow the ink composition to be capable of forming an ink film excellent in scratch resistance.

Also, there are no particular limitations on "p" if it is an integer of 2 or more; it is appropriately set according to a factor such as a weight average molecular weight.

The polysiloxane-based resin may include an additional siloxane structural unit other than the structural unit represented by the formula (1), as the siloxane structural unit.

As such an additional siloxane structural unit, for example, a radical polymerizable siloxane structural unit having a radical polymerizable group may be included.

The polysiloxane-based resin including the radial polymerizable siloxane structural unit allows polymerization with the (meth)acrylate monomer configured in the acrylic resin via the radical polymerizable group. Thereby, for example, the silicon-acrylic resin in which the acrylic resin and the polysiloxane-based resin are bonded, can be easily obtained.

The radical polymerizable silane compound that can constitute such a radical polymerizable siloxane structural unit may be the one bondable with the structural unit represented by the formula via a polysiloxane bonding.

The content ratio of the acrylic structural unit and the siloxane-based structural unit (acrylic structural unit/siloxane structural unit) configured in the silicon-acrylic resin is to the extent that can form an ink film excellent in both film strength and scratch resistance, and is preferably in the range of 1/10 to 10/1. The content ratio being in the above described range allows the ink composition to be capable of obtaining an ink film excellent in both film strength and scratch resistance.

Also, the content of a silicon (Si) element in the silicon-acrylic resin may be to the extent that can form an ink film having desired scratch resistance; for example, the lower limit may be 1 mass % or more, is preferably 2 mass % or more, further preferably 3 mass % or more, and further more preferably 5 mass % or more.

Also, the upper limit of the content may be 50 mass % or less, is preferably 45 mass % or less, and further more preferably 40 mass % or less.

The upper limit and the lower limit of the content being in the above described range allows the ink composition to be capable of obtaining an ink film excellent in both film strength and scratch resistance.

Incidentally, the method for measuring the Si element content may be a method capable of accurately measuring the Si element content in the silicon-acrylic resin; for example, it may be measured by a method such as an ICP (Inductively Coupled Plasma) mass analysis method, and an XRF (X-ray Fluorescence Analysis).

The molecular weight of the silicon-acrylic resin may be to the extent that can form an ink film having desired scratch resistance; for example, it may be in the range of 10000 to 10000000, and above all, is preferably in the range of 100000 to 500000. The molecular weight being in the above described range allows the ink composition to easily obtain an ink film excellent in both film strength and scratch resistance. Also, the emulsion state can be stably maintained in the ink composition thereby.

Incidentally, hereinafter, the molecular weight indicates the weight average molecular weight Mw, which is the value measured by GPC (Gel Permeation Chromatography) (HLC-8120GPC from TOSOH CORPORATION, using N-methylpyrrolidone with the addition of 0.01 mol/litter lithium bromide as a dissolution medium, Mw377400, 210500, 96000, 50400, 206500, 10850, 5460, 2930, 1300, and 580 (those Easi PS-2 series from Polymer Laboratories) and Mw1090000 (from TOSOH CORPORATION) as polystyrene standard for calibration curve, and two columns of TSK-GEL ALPHA-MX as the measurement column.

The glass transition temperature of the silicon-acrylic resin may be to the extent that can form an ink film having desired scratch resistance; for example, it may be in the range of $-50°$ C. to $150°$ C., and above all, is preferably in the range of $-20°$ C. to $120°$ C., and in particular, preferably in the range of $0°$ C. to $110°$ C. The glass transition temperature being in the above described range allows the ink composition to be capable of obtaining an ink film excellent in both film strength and scratch resistance.

Incidentally, hereinafter, the glass transition temperature may be measured using a differential scanning calorimeter by a DSC method. In more specific, the glass transition temperature may be measured by a differential scanning calorimeter (DSC) such as the differential scanning calorimeter "DSC-50" from Shimadzu Corporation. Incidentally, a plurality of the glass transition temperature may be observed in some cases, but the main transition temperature with the larger endothermic amount may be adopted in the present invention.

Also, Tg may be adjusted depending on the factors such as the kind and the content of monomer configured in the resin.

As the method for forming the silicon-acrylic resin, a known method may be used.

As the forming method, for example, as described in JP-A No. H09-087586, a method of emulsion-polymerizing a polysiloxane macro monomer having a polymerizable group such as a (meth)acryloyl group, a vinyl group, a styryl group, an epoxy group, an alkoxysilyl group, and a mercapto group at the end, together with (meth)acrylate, can be used.

Also, as the forming method, a method in which a polysiloxane-based resin having a polymerizable siloxane structural unit is formed as the polysiloxane-based resin, and then emulsion-polymerizing thereof together with (meth) acrylate monomer capable of constituting an acrylic resin, can be used.

The lower limit of the average particle diameter of the silicon-acrylic resin emulsion in the ink composition may be, from the viewpoint of the dispersion stability of the silicon-acrylic resin emulsion and enabling the composition to form an ink film more excellent in film strength and scratch resistance, 10 nm or more, and above all, is preferably 30 nm or more, and further preferably 50 nm or more.

Also, the upper limit of the average particle diameter may be 500 nm or less, and above all, is preferably 300 nm or less, and further preferably 250 nm or less.

The average particle diameter (average dispersion particle diameter) of the resin emulsion can be determined by dynamic light scattering. The dynamic light scattering is a method to measure a particle size utilizing the difference of light intensity distribution of diffractive scattering light depending on the particle sizes when laser light is illuminated to the particles; for example, the measurement can be conducted using micro track particle distribution measurement apparatus UPA from Nikkiso Co., Ltd., and a concentrated type particle size analyzer FPAR-1000 from OTSUKA ELECTRONICS Co., LTD. Also, the measurement may be conducted in the conditions: the measurement temperature of $25°$ C., the integration time of 3 minutes, and the wavelength of the laser used in the measurement being 660 nm, from the obtained data, the scattering intensity distribution is obtained, and the particle diameter with the highest frequency may be determined as the average particle diameter. Incidentally, the average particle diameter here is a volume average particle diameter.

The silicon-acrylic resin emulsion includes the silicon-acrylic resin, and may include an additional component as required.

Examples of such an additional component may include an emulsifying agent used for polymerizing the silicon-acrylic resin.

As the emulsifying agent, the one generally use for emulsion polymerization can be used; in specific, the one described in publications such as JP-A No. 2012-051357 can be used.

Examples of commercially available products of the silicon-acrylic resin emulsion may include, but not limited to, CHALINE FE-502 (silicon-acrylic copolymer resin emulsion from Nissin Chemical co., ltd.; ratio of acrylic structural unit/siloxane structural unit: 5/5; glass transition temperature: $-20$ to $-10°$ C.), CHALINER-170BX (silicon-acrylic copolymer resin emulsion from Nissin Chemical co., ltd.; ratio of acrylic structural unit/siloxane structural unit: 7/3; glass transition temperature: $100°$ C.), ACRIT KS-3705 (silicon-acrylic resin emulsion from TAISEI FINE CHEMICAL CO., LTD.; ratio of acrylic structural unit/siloxane structural unit: 7/3), MOWINYL LDM7523 (silicon-acrylic resin emulsion from The Nippon Synthetic Chemical Industry Co., Ltd.; Tg $55°$ C.; acid value 20 mgKOH/g), AE980 (silicon-acrylic resin emulsion from JSR Corporation; glass transition temperature: $-14°$ C.), AE981A (silicon-acrylic-styrene resin emulsion from JSR Corporation; glass transition temperature: $-15°$ C.), AE982 (silicon-acrylic-styrene resin emulsion from JSR Corporation; glass transition temperature: $0°$ C.), and Polysol™ AP-3900 (silicon-acrylic resin emulsion from SHOWA DENKO K.K.).

Incidentally, the ratio of acrylic structural unit/siloxane structural unit indicates the mass ratio.

(2) Second Resin Emulsion

The second resin emulsion is a resin emulsion other than the silicon-acrylic resin emulsion.

There are no particular limitations on such a second resin emulsion if it is a resin other than a copolymer including both the acrylic structural unit and the siloxane-based structural unit in the structure, and capable of forming an ink film with desired film strength.

As the second resin, for example, an acrylic resin, a polystyrene resin, a polyester resin, a styrene-acrylic resin, a styrene resin, an acrylic-vinyl chloride resin, a vinyl chloride resin, a vinyl acetate resin, a vinyl chloride vinyl acetate copolymer resin, a polyethylene resin, an urethane resin, an acrylic polyester resin, an urethane-acrylic resin, a silicone (silicon) resin, an acrylamide resin, an epoxy resin, and the copolymer resin and mixture of these may be used.

In the present invention, the second resin is preferably the resin such as an acrylic resin, an urethane resin, an urethane-acrylic resin, a polyester resin, an acrylic polyester resin, a styrene acrylic resin, and an acrylic-vinyl chloride resin, and above all, an acrylic resin is preferable.

The second resin being the above described resin facilitates the adjustment of the monomer composition, the adjustment of the glass transition temperature (Tg), and the adjustment of the film formability and film resistance of the resin to allow the ink composition to be capable of forming an ink film excellent in film strength.

Incidentally, the second resin may be used in just one kind, two or more kinds thereof may be mixed and used.

Incidentally, as the second resin, the one generally used in an ink composition may be used.

For example, there are no particular limitations on the acrylic resin if it includes a structural unit derived from (meth)acrylate monomer; for example, it may be the same as the acrylic resin described in the section "(1) Silicon-acrylic resin" above.

As the urethane resin, a generally known urethane resin used in an ink composition may be used.

For example, a copolymer of polyol having a hydroxy group as a side chain, such as polyether polyol and polycarbonate polyol with diisocyanate such as hexamethylene diisocyanate and isophoronediisocyanate, described in publications such as JP-A No. 2016-027167 may be used.

As the urethane-acrylic resin, a generally known urethane-acrylic resin used in an ink composition may be used.

For example, a copolymer of acryl polyol including the acrylic structural unit as a main component with diisocyanate may be used.

Also, the content in the acrylic structural unit and the acryl polyol may be the same as that of the acrylic structural unit described in the section "(1) Silicon-acrylic resin" above.

The acrylic-vinyl chloride resin includes both the structural unit derived from (meth)acrylate monomer (acrylic structural unit) and the structural unit derived from vinyl chloride (vinyl-chloride-based structural unit).

The acrylic-vinyl chloride resin may be a random copolymer in which the acrylic structural unit and the vinyl-chloride-based structural unit are randomly copolymerized; however, a block copolymer in which the end of an acrylic resin having the acrylic structural unit as the main component and the end of a vinyl-chloride-based resin having a vinyl-chloride-based structural unit as a main component, are bonded together, an acrylic-vinyl-chloride-based graft copolymer in which a vinyl-chloride-based resin is bonded as a side chain to the main skeleton of the acrylic resin, a vinyl-chloride-acrylic graft copolymer in which an acrylic resin is bonded as a side chain to the main skeleton of a vinyl-chloride-based resin, and the one in which these copolymers are bonded together may be preferably used.

Incidentally, the content in the acrylic structural unit and the acrylic resin may be the same as that of the acrylic resin described in the section "(1) Silicon-acrylic resin" above.

Also, the content of the vinyl-chloride-based structural unit included in the vinyl-chloride-based resin as a main component may be to the extent capable of achieving desired features such as film strength, and may be the same as the content of the acrylic structural unit in the acrylic resin described in the section "(1) Silicon-acrylic resin" above.

The molecular weight of the second resin may be to the extent that can form an ink film with desired film strength; for example, it may be in the range of 10000 to 50000000, and above all, is preferably in the range of 100000 to 2000000. The molecular weight being in the above described range allows the ink composition to easily obtain an ink film excellent in film strength. Also, the second emulsion can be stably maintained in emulsion state in the ink composition.

The glass transition temperature of the second resin may be to the extent that can form an ink film with desired film strength; for example, it may be in the range of 20° C. to 110° C., above all, is preferably in the range of 30° C. to 90° C., and in particular, is preferably in the range of 40° C. to 70° C. The glass transition temperature being in the above range allows the ink composition to easily form an ink film with favorably dried and excellent in film strength.

Acid value of the second resin may be to the extent that can form an ink film with desired film strength; for example, it may be in the range of 0 mgKOH/g to 50 mgKOH/g, is preferably in the range of 0.01 mgKOH/g to 30 mgKOH/g, and above all, preferably in the range of 0.01 mgKOH/g to 25 mgKOH/g. The acid value being in the above range allows the ink composition to easily form an ink film excellent in film strength.

Incidentally, the acid value in the present invention refers to the mass of potassium hydroxide (mg) required to neutralize the acid component included in 1 g of a sample (solid content of a resin); it may be measured from the method in conformity to the method described in JIS K 0070.

Also, such an acid value may be adjusted by means such as the kind and the content of the monomer configured in the resin. The acid value may be, for example, adjusted by a feature such as the content of the structural unit derived from an acid-group-containing monomer such as (meth)acrylate in the second resin.

The lower limit of the average particle diameter of the second resin emulsion in the ink composition may be, from the viewpoint of a feature such as dispersion stability of the second resin, 10 nm or more, and above all, is preferably 30 nm or more, and further preferably 50 nm or more.

Also, the upper limit of the average particle diameter may be 500 nm or less, and above all, is preferably 300 nm or less, and further preferably 250 nm or less.

In this range, the second resin emulsion can have favorable ink-jet ejection properties, and can favorably form an ink film.

The second resin emulsion includes the second resin, and may include an additional component as required.

Examples of such an additional component may be in the same contents as those described in, for example, "(1) Silicon-acrylic resin" above.

2. Aqueous Solvent

The aqueous solvent includes water and a water-soluble organic solvent.

Also, the aqueous solvent disperses or dissolves a coloring agent, a resin emulsion, and a surfactant:

The content ratio of water and the water-soluble organic solvent in the aqueous solvent (water/water-soluble organic solvent) may be to the extent that can stably disperse materials such as the resin emulsion; for example, it may be in the range of 1/10 to 10/1, and above all, is preferably in the range of 3/10 to 10/3. The content ratio of water and the water-soluble solvent being in the above described range allows the ink composition to be capable of stably dispersing materials such as the resin emulsion.

Incidentally, the content ratio indicates the mass ratio.

The water-soluble organic solvent may be the one 10 parts by mass or more thereof can be dissolved in 100 parts by mass of water at 25° C. under 1 pressure.

As such a water-soluble organic solvent, for example, an aqueous organic solvent described in JP-A No. 2014-189777 may be used.

In the present invention, it is preferable that the water-soluble organic solvent includes alkanediols having a structure in which two of a hydroxyl group is bonded to a chain saturated hydrocarbon, and above all, it is preferable that the alkanediols are included as the main component.

The alkanediols are excellent in dispersing stability of the resin emulsion. Thus, the ink composition may be excellent in dispersing stability of the resin emulsion. Also, as the result, it is easy to increase the content ratio of the water-soluble organic solvent in the aqueous solvent.

Also, the boiling point of the alkanediols is usually higher than water; thus, it is easy for the ink composition to have less dry adhesion to a nozzle.

In this manner, usage of the alkanediols as the water-soluble organic solvent allows the ink composition to maintain the dispersing stability of the resin emulsion while having less adhesion to a nozzle.

Also, included as a main component means to be included in the content with which the resin emulsion can be stably dispersed; for example, the content of the alkanediols in the water-soluble organic solvent may be 50 mass % or more, is preferably 60 mass % or more, more preferably 70 mass % or more, and further preferably 80 mass % or more.

Incidentally, the upper limit of the content may be appropriately set in the range capable of obtaining desired dispersing stability; it may be included in 100 mass %, that means, the water-soluble organic solvent may include just the alkanediols, and the content may be appropriately adjusted to, for example, 95 mass % or less.

In the present invention, the content of the alkanediols in the ink composition may be adjusted from the viewpoints such as the dispersing stability of the ink composition, inhibition of adhesion to a nozzle, and drying properties of the ink film.

For example, when the content of the water-soluble organic solvent in the ink composition is 50 mass % or less, the water-soluble organic solvent may just include the alkanediols, that means the whole amount of the water-soluble organic solvent may be the alkanediols.

Also, when the content of the water-soluble organic solvent in the ink composition is more than 50 mass %, the water-soluble organic solvent may include just the alkanediols, that means, the whole amount of the water-soluble organic solvent may be the alkanediols; however, the content of the alkanediols in the ink composition is preferably 50 mass % or more, and above all, preferably 10 mass % or more and 45 mass % or less, and in particular, preferably 35 mass % or more and 45 mass % or less. The upper limit and the lower limit of the content being in the above described range allows the ink composition to easily be excellent in features such as the dispersing stability of the ink composition, inhibition of adhesion to a nozzle, and drying properties of the ink film. For example, the water-soluble organic solvent includes the alkanediols and a water-soluble organic solvent that is other than the alkanediols and has larger vapor pressure than that of the alkanediols added thereto, so as the ink composition to easily obtain an ink film with excellent drying properties. Meanwhile, inclusion of the alkanediols in the specific amount or more allows the ink composition to easily be excellent in features such as dispersing stability and inhibition of adhesion to a nozzle.

As the water-soluble organic solvent that is other than the alkanediols and has larger vapor pressure than that of the alkanediols added thereto, the difference of the vapor pressure from the alkanediols added thereto is preferably 100 Pa or more, and above all, preferably 150 Pa or more, and in particular, preferably 200 Pa or more.

Incidentally, the vapor pressure (Pa) indicates the saturated vapor pressure at 50° C. For example, the vapor pressure of propylene glycol is 133 Pa, and the vapor pressure of 3-methoxy-1-butanol is 460 Pa.

Also, when the alkanediols added thereto are 2 kinds or more, the difference from the vapor pressure of the alkanediols added thereto refers to the difference from the vapor pressure of the alkanediols with the highest vapor pressure.

The alkanediols may be the one having a structure in which two of a hydroxyl group is bonded to a chain saturated hydrocarbon; in particular, diols described in JP-A No. 2014-189777 may be used.

In the present invention, the alkanediols are preferably alkanediols having 6 or less carbon atoms such as ethylene glycol, propylene glycol, diethylene glycol, dipropylene glycol, 1,3-propanediol, isobutylene glycol, triethylene glycol, 1,2-butandiol, 1,3-butandiol, 1,4-butandiol, 1,2-pentandiol, 1,2-hexandiol, 1,5-pentandiol, 1,6-hexanediol, 2-methyl-2,4-pentandiol, 3-methyl-1,3-butandiol, and 3-methyl-1,5-pentandiol. The alkanediols facilitates the maintenance of the dispersing stability of the resin emulsion while having less adhesion to a nozzle.

The boiling point of the water-soluble organic solvent may be to the extent capable of forming an ink film; for example, it is preferably 280° C. or less, and above all, preferably in the range of 150° C. to 250° C. The boiling point in the above described range allows the ink composition to easily have less dry adhesion to a nozzle, and be favorable in ejection properties. Also, the upper limit of the boiling point in the above described range allows the ink film of the ink composition to be easily dried and be excellent in film strength such as water resistance and adhesiveness.

Also, in the present invention, from the viewpoint of forming an ink film excellent in drying properties, for example, in the water-soluble organic solvent, the content of the water-soluble organic solvent of which boiling point is 240° C. or more in the ink composition is preferably less than 5 mass %.

The content of the water-soluble organic solvent may be to the extent that can stably disperse or dissolve each component such as the resin emulsion.

The content in the ink composition may be 80 mass % or less, is preferably 70 mass % or less, and above all, preferably 60 mass % or less, in particular, preferably in the range of 0.1 mass % to 50 mass %, and above all, preferably in the range of 1 mass % to 40 mass %. The content of the water-soluble organic solvent in the above described range allows the ink composition to easily obtain an ink film excellent in drying properties.

Also, the content of the water-soluble organic ink in the ink composition is, from the viewpoint of dispersing stability, preferably 80 mass % or less, and from the viewpoint of inhibition of adhesion to a nozzle, preferably 5 mass % or more.

In the present invention, from the viewpoints of dispersing stability and inhibition of adhesion to a nozzle, the content of the water-soluble organic ink in the ink composition is, preferably 15 mass % or more and 70 mass % or less, and above all, preferably 25 mass % or more and 60 mass % or less. The upper limit and the lower limit of the content of the water-soluble organic solvent in the above described range allows the ink composition to be excellent in dispersing stability and have less adhesion to a nozzle.

Also, the content of the water-soluble organic solvent in the ink composition may be, from the viewpoints of both the formation of an ink film excellent in drying properties and inhibition of adhesion to a nozzle, 15 mass % or more and 80 mass % or less, is preferably 20 mass % or more and 70 mass % or less, and above all, preferably 25 mass % or more and 60 mass % or less, in particular, preferably 30 mass % or more and 60 mass % or less, and particularly above all, preferably 40 mass % or more and 60 mass % or less.

Also, the content of the aqueous solvent may be to the extent that can stable disperse or dissolve each component such as the resin emulsion.

Incidentally, the content of the water-soluble organic solvent and aqueous solvent may be respectively referred to as just the content of the water-soluble organic solvent and the content of the aqueous solvent.

3. Surfactant

The surfactant is to adjust the surface tension of the ink composition and to adjust the wet spread of the ink composition to a recording medium where the ink composition is ink-jet ejected.

As such a surfactant, a generally known surfactant used in an ink composition may be used. In particular, as the surfactant, the surfactant described in JP-A No. 2015-124379 may be used.

In the present invention, above all, the surfactant is preferably a polysiloxane-based surfactant of which weight average molecular weight is in the range of 1000 to 30000 since it has an excellent effect of reducing the surface tension that allows the ink composition to be excellent in temporal stability of surface tension and excellent in printing suitability.

The polysiloxane-based surfactant has polysiloxane as a main skeleton.

Here, to have polysiloxane as a main skeleton may refer to, in particular, to have the siloxane structural unit represented by the below formula (2) as a main component.

[Chemical Formula 2]

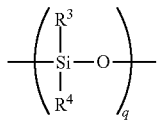

(2)

In the formula (2), $R^3$ and $R^4$ each independently represents a hydrogen atom, an alkyl group with 1 to 4 carbon atoms and a phenyl group; a plurality of $R^3$ and $R^4$ may be the same and may be different from each other. Also, q is an integer of 2 or more.

Also, there are no particular limitations on "q" if it is an integer of 2 or more, and it is appropriately set according to factors such as the weight average molecular weight.

$R^3$ and $R^4$ in the formula (2) may be the same as $R^1$ and $R^2$ described in the section "1. Silicon-acrylic resin emulsion" above.

The siloxane structural unit represented by the formula (2) is included in the polysiloxane-based surfactant as a main component.

Here, included as a main component means to be included in the content capable of giving the ink composition an effect of reducing surface tension; for example, the structural unit represented by the formula (2) may be mass % or more in the polysiloxane-based surfactant. In the present invention, the content of the structural unit represented by the formula (2) in the polysiloxane-based surfactant is more preferably 75 mass % or more. The content in the above described range allows the polysiloxane-based surfactant to have an excellent effect of reducing surface tension.

There are no particular limitations on the polysiloxane-based surfactant if it has the siloxane structural unit as the main component; however, the one having a polyether group, that is, a polyether group modified polysiloxane-based surfactant is preferable. The inclusion of the polyether group easily allows the polysiloxane-based surfactant to have water-solubility.

Examples of the polyether group may include an alkylene oxide containing group; above all, an ethylene oxide containing group and a propylene oxide containing group are preferable, and in particular, an ethylene oxide containing group is preferable. The reason therefor is that the polyether group facilitates the polysiloxane-based surfactant to have water-solubility.

There are no particular limitations on the polyether group modified polysiloxane-based surfactant, if it has the polyether group; an example thereof is the one having a polyether group containing structural unit in which one of a silicon atom at one end or both ends of the polysiloxane structure, and the side chain of the polysiloxane structure, that is $R^3$ and $R^4$ in the siloxane structural unit represented by the formula (2), is substituted with a polyether group.

There are no particular limitations on the weight average molecular weight of the polysiloxane-based surfactant if it is in the range of 1000 to 30000; it is preferably in the range of 2000 to 20000, and above all, preferably in the range of 3000 to 10000. The molecular weight in the above described range allows the ink composition of the present invention to be excellent in wet spreadability.

Examples of the commercially available product of the polysiloxane-based surfactant may include FZ-2122, FZ-2110, FZ-7006, FZ-2166, FZ-2164, FZ-7001, FZ-2120, SH 8400, FZ-7002, FZ-2104, 8029 ADDITIVE, 8032 ADDITIVE, 57 ADDITIVE, 67 ADDITIVE, 8616 ADDITIVE (all from The Dow Chemical Company), KF-6012, KF-6015, KF-6004, KF-6013, KF-6011, KF-6043, KP-104, 110, 112, 323, 341 (all from Shin-Etsu Chemical Co., Ltd.), BYK-300/302, BYK-301, BYK-306, BYK-307, BYK-320, BYK-325, BYK-330, BYK-331, BYK-333, BYK-337, BYK-341, BYK-342, BYK-344, BYK-345/346, BYK-347, BYK-348, BYK-349, BYK-375, BYK-377, BYK-378, BYK-UV3500, BYK-UV3510, BYK-310, BYK-315, BYK-370, BYK-UV3570, BYK-322, BYK-323, BYK-3455, BYK-Silclean3700 (all from BYK), SILFACE SAG503A, SILFACE SJM-002, SILFACE SJM-003 (all from Nissin Chemical Industry Co., Ltd.), TEGO Twin 4000, TEGO Twin 4100, TEGO Wet 240, TEGO Wet 250, and TEGO Wet 240 (all from Evonik).

The polysiloxane-based surfactant is preferably water-soluble; if it is water-soluble, the deterioration of ejecting properties due to deposition of the polysiloxane-based surfactant to the surface of the ink composition and to the surface of the member in an ink-jet head that causes repelling of the ink composition can be inhibited. Here, water-soluble means 0.1 parts by mass or more can be dissolved in 100 parts by mass of water at 25° C. under 1 pressure.

Incidentally, the method for adjusting the level of water-solubility of the polysiloxane-based surfactant may be adjusted by the factors such as the kind and number of the polyether group, and the molecular weight of the polysiloxane-based surfactant.

Also, as the surfactant, an additional surfactant other than the above described polysiloxane-based surfactant may be used.

Specific examples of the additional surfactant may include an anion-based surfactant, a non-ionic surfactant, a fluorine-based surfactant, an alkylene-oxide-modified acetylene-glycol-based surfactant, and an alkylene-oxide-non-modified acetylene-glycol-based surfactant.

Specific examples of the alkylene-oxide-non-modified acetylene-glycol-based surfactant may include 2,5-dimethyl-3-hexyne-2,5-diol, 3,6-dimethyl-4-octyne-3,6-diol, 2,4,7,9-tetramethyl-5-decyne-4,7-diol, 3,5-dimethyl-1-hexyne-3-ol, 3-methyl-1-butyne-3-ol, 3-methyl-1-pentyne-3-ol, 3-hexyne-2,5-diol, and 2-butyn-1,4-diol. Also, as the commercialized product thereof, products such as Sufynol61, 82, and 104 (all from Air Products and Chemicals, Inc.) may be used.

Specific examples of the alkylene-oxide-modified acetylene-glycol-based surfactant may include Sufynol420, 440, 465, 485, TG, 2502, Dyno1604, 607 (all from Air Products and Chemicals, Inc.), Sufynol SE, MD-20, OlfineE1004, E1010, PD-004, EXP4300, PD-501, PD-502, SPC (all from Nissin Chemical Co., Ltd.), Acetynol EH, E40, E60, E81, E100, and E200 (all from Kawaken Fine Chemicals Co., Ltd.).

Specific examples of the anion-based surfactant, the non-ionic surfactant, the fluorine-based surfactant, and the alkylene-oxide-modified acetylene-glycol-based surfactant may include EMAL, LATEMUL, NEOPELEX, DEMOL (all an anion-based surfactant from Kao Corporation.), SUNNOL, LIPOLAN, LIPON, LIPAL (all an anion-based surfactant from Lion Corporation.), NOIGEN™, EPAN™, SORGEN™ (all non-ionic surfactant from DKS Co. Ltd.), EMULGEN, AMIET, EMASOL (all non-ionic surfactant from Kao Corporation.), NAROACTY, EMULMIN, SANNONIC (all non-ionic surfactant from Sanyo Chemical Industries, Ltd.), MEGAFACE (fluorine-based surfactant from DIC Corporation.), SURFLON (fluorine-based surfactant from AGC SEIMI CHEMICAL CO., LTD.), AEROSOL TR-70, TR-70HG, OT-75, OT-N, MA-80, IB-45, EF-800, A-102 from Cytec Industries Japan LLC., PELEX OT-P, PELEX CS, PELEX TR, PELEX TA from Kao Corporation., Newcol™290-A, Newcol™290-KS, Newcol™291-M, Newcol™291-PG, Newcol™291-GL, Newcol™ 292-PG, Newcol™ 293, Newcol™ 297 from NIPPON NYUKAZAI CO., LTD. (all an anion-based surfactant), EMULGEN 320P, EMULGEN 350, EMULGEN 430, EMULGEN 130K, EMULGEN 150 from Kao Corporation., NOIGEN™ TDS-120, NOIGEN™ TDS-200D, NOIGEN™ TDS-500F from DKS Co. Ltd., BLAUNON SR-715, BLAUNON SR-720, BLAUNON SR-730, BLAUNON SR-750, BLAUNON EN-1520A, BLAUNON EN-1530, BLAUNON EN-1540 from AOKI OIL INDUSTRIAL Co., Ltd., Newcol™2310, Newcol™ 2320, Newcol™2327, Newcol™1545, Newcol™1820 from NIPPON NYUKAZAI CO., LTD., and NIKKOL BPS20, NIKKOL BPS30 from Nikko Chemicals Co., Ltd. (all non-ionic surfactant).

These surfactant may be used solely and two or more kinds thereof may be used together.

There are no particular limitations on the content of the surfactant if it has desired wet spreadability; for example, in the ink composition, the content is preferably in the range of 0.01 mass % to 10.0 mass %, more preferably in the range of 0.1 mass % to 5.0 mass %, further preferably in the range of 0.3 mass % to 5.0 mass %, and more preferably from 0.5 mass % to 3.0 mass % or less. The content in the above described range allows the ink composition to have favorable wet spreadability, and the dot diameter of the impact of the ink composition to a recording medium can be widened. Also, an ink film can be excellent in both film strength and scratch resistance thereby.

4. Coloring Agent

As the coloring agent in the present invention, a generally known coloring agent used in an aqueous ink can be used; for example, a pigment such as an organic pigment and an inorganic pigment can be used.

As such a pigment, for example, the one described in JP-A No. 2015-124379 can be used.

Also, the pigment may be a pigment dispersion in which the pigment is dispersed in an aqueous solvent by a material such as a surfactant for pigment dispersion and a dispersing agent, and it may be included as a hydrophilic group modified self-dispersing pigment dispersion on the pigment surface. Incidentally, as the hydrophilic group and the dispersing agent, those described in JP-A No. 2015-124379 can be used.

There are no particular limitations on the content of the coloring agent if it is capable of forming a desired image and may be appropriately adjusted. In specific, it may depend on the kind of the coloring agent, but the content to the whole amount 100 mass % of the ink composition is preferably in the range of 0.05 parts by mass to 20 parts by mass, and more preferably in the range of 0.1 parts by mass to 10 parts by mass. The content in the above described range allows the balance between the dispersing stability and the tinting strength of the coloring agent to be excellent.

5. Other Components

The ink composition of the present invention comprises an aqueous solvent, a coloring agent, a resin emulsion, and a surfactant, and may further include an additional component as required.

Examples of the additional component may include a penetrant, a humectant, a preservative, an antioxidant, a conductivity adjuster, a pH adjuster, a viscosity adjuster, an antifoamer, and a deoxidizing agent.

6. Ink Composition

There are no particular limitations on the method for preparing the ink composition of the present invention I fit is a method that allows the each component to be dispersed or dissolved in a solvent.

Examples of the preparation method may include a preparation method in which a pigment dispersion is added to the aqueous solvent as the coloring agent and dispersed and then the resin emulsion, the surfactant and an additional component as required are added thereto, a preparation method in which the coloring agent and a dispersing agent are added to the aqueous solvent to be dispersed, and then the resin emulsion, the surfactant and an additional component as required are added thereto, and a preparation method in which the coloring agent, the resin emulsion, the surfactant and an additional component as required are added to the aqueous solvent and then the coloring agent is dispersed.

B. Ink-set for Ink-jet Recording

Next, the ink-set for ink-jet recording of the present invention is explained.

The ink-set for ink-jet recording of the present invention is characterized by comprising the above described ink composition for ink-jet recording, and a receiving solution containing a multivalent metal salt.

According to the present invention, the above described ink composition for ink-jet recording is included and thus a printing excellent in both film strength and scratch resistance as well as in image clearness can be obtained.

The ink-set for ink-jet recording of the present invention comprises the above described ink composition for ink-jet recording and a receiving solution.

Each constitution of the ink-set for ink-jet recording of the present invention is hereinafter explained in details.

Incidentally, the ink composition may be in the same contents of those described in the section "A. Ink composition for ink-jet recording" above; thus, the descriptions herein are omitted.

1. Receiving Solution

The receiving solution used in the present invention contains a multivalent metal salt.

(1) Multivalent Metal Salt

There are no particular limitations on the multivalent metal salt if it improves the fixity of the ink composition on a recording medium and a metal salt of divalent or more configured by a pair of a multivalent metal ion and the negative ion that is a pair of the multivalent ion; it may be an inorganic metal salt and may be an organic acid metal salt. It is preferable that such a multivalent metal salt is one kind o more selected from a group consisting of calcium salt, magnesium salt, nickel salt, aluminum salt, boron salt, and zinc salt. The reason therefor is to inhibit the bleeding of an ink and the bleeding of a color between different colors (among inks) to obtain an image excellent in image clearance without printing nonuniformity or a missing white part.

Incidentally, the metal salt of divalent or more may be used in one kind solely, and may be used in combination of two or more kinds.

Also, as the inorganic metal salt and the organic acid metal salt, in specific, those described in JP-A No. 2012-051357 may be used.

(2) Receiving Solution

The receiving solution contains the multivalent metal salt, and usually include a solvent, a resin component and a surfactant.

Also, it may include a material such as a penetrant, a preservative, an antioxidant, conductivity adjuster, a pH adjuster, a viscosity adjuster, an antifoamer, and a deoxidizing agent, as required.

Incidentally, as the surfactant, the one same as that described in the section "A. Ink composition for ink-jet recording" above may be used.

Also, the solvent, the resin component, and the other additive may be those generally used in a receiving solution; for example, those described in JP-A No. 2012-051357 may be used.

2. Ink-set

The ink-set of the present invention includes the ink composition and a receiving solution, and may include an additional constitution as required.

C. Ink Cartridge

Next, the ink cartridge of the present invention is explained.

The ink cartridge of the present invention is characterized by comprising a container for ink, an ink composition stored in the container for ink, wherein the ink composition is the above described ink composition for ink-jet recording.

According to the present invention, the above described ink composition for ink-jet recording is included as the ink composition so as to obtain a printing excellent in both film strength and scratch resistance.

The ink cartridge of the present invention includes a container for ink and an ink composition.

Each constitution of the ink cartridge of the present invention is hereinafter explained in details.

Incidentally, the ink composition may be in the same contents as those described in the section "A. Ink composition for ink-jet recording" above; thus, the descriptions herein are omitted.

1. Container for Ink

The container for ink is to store the ink composition.

Such an ink container may be the one that can be used in an ink-jet printer; there are no particular limitations on the container. The shape, structure, size, and material thereof may be appropriately selected according to a purpose; suitable examples thereof may include the one having an ink bag formed by an aluminum laminate film and a resin film. An example thereof may be a bag-shape container such as an ink bag formed by layering two pieces of an aluminum laminate films bonded by means such as heat sealing described in publications such as Japanese Unexamined Patent No. 2005-518974, JP-A No. 2013-144774, and JP-A No. 2015-1933824.

Also, the ink container may be the one having an opening for taking out an ink to eject the ink composition during usage.

Regarding the ink container, at least one thereof is included in the ink cartridge of the present invention, and may be two or more thereof may be included.

When the number of the ink container is two or more, the kind of the ink composition stored in each ink container may be the same and may be different from each other.

Incidentally, examples of the combination of the ink composition when the kind is different may include a combination of ink compositions of which kind of the coloring agent included in the ink composition is different and that can form an ink film with different colors.

2. Ink Cartridge

The ink cartridge of the present invention includes the container for ink and the ink composition, and may include an additional constitution as required. It is particularly preferable that the ink cartridge is used by installing thereof to an ink-jet recording device in removable state.

The additional constitution may be the one generally used in an ink cartridge, and examples thereof may include an outside frame covering the ink container.

Such an outside frame may be the one general in an ink cartridge; for example, it may be the same as a material such as a case using an upper case and a lower case described in publications such as Japanese Unexamined Patent No. 2005-518974, JP-A No. 2013-144774, and JP-A No. 2015-193824.

Also, the outside frame may include an opening where the opening for taking out an ink arranged in the ink container is exposed.

D. Method for Producing Printing

Next, the method for producing a printing of the present invention is explained.

The method or producing a printing of the present invention is characterized by comprising a printing step of ejecting the above described ink composition for ink-jet recording by an ink-jet method.

According to the present invention, the above described ink composition for ink-jet recording is used in the printing step so as to obtain a printing excellent in both film strength and scratch resistance.

The method for producing a printing of the present invention includes the printing step.

Each step in the method for producing a printing of the present invention is hereinafter described in details.

1. Printing Step

The printing step is a step of ejecting the above described ink composition for ink-jet recording by an ink-jet method.

The ink-jet method in this step may be any ink-jet method such as in piezo type, thermal type, and static type. Among them, the piezo type ink-jet method is preferably from the points an aggregate is not easily generated and it is excellent in ejecting stability.

Incidentally, the ink-jet head (recording head) in piezo type uses a piezoelectric vibrator as a pressure generating element, and ejects an ink drop by deforming the piezoelectric vibrator to pressurize or decompress the pressure room.

The ink drop amount of the ink composition to be ejected by the ink-jet method in the present step may be appropriately set according to factors such as application and color, and it may be in the range of 0.5 pl to 30 pl.

There are no particular limitations on the recording medium to which the ink composition is ejected in the present step if it can be printed using the ink composition; both an absorbent substrate and an unabsorbent substrate may be used.

Exemplifications of the absorbent substrate may include uncoated paper such as woody paper, medium quality paper, and wood free paper; coated paper such as coated paper, art paper, and cast paper; cotton, artificial fiber textile, silk, hemp, fabric, nonwoven fabric, and leather. Also, exemplifications of the unabsorbent substrate may include but is not limited to a polyester-based resin, a polyethylene-based resin, a polypropylene-based resin, a vinyl-chloride resin, a polyimide resin, and the aforementioned resin containing synthetic paper, a metal, a metal foil coated paper, glass, synthetic rubber, and natural rubber.

In the present invention, above all, the recording medium is preferably the unabsorbent substrate, and among them, a substrate made of a resin such as a polyester-based resin, a polyethylene-based resin, a propylene-based resin, a vinyl chloride resin, a polyimide resin, and the aforementioned resin containing synthetic paper is preferable, and a substrate made of a vinyl chloride resin is more preferable. The recording medium with the usage of the above described ink composition allows the effect in the present invention, obtaining a printing excellent in film strength and scratch resistance, to be more effectively exhibited.

2. Additional Step

The production method of the present invention includes the printing step and may include an additional step as required.

Examples of the additional step may include a receiving solution placing step of placing the receiving solution on the recording medium before the printing step, and a drying step of drying and removing the aqueous solvent included in the ink composition film of the ink composition by means such as heating the recording medium after the printing step to form an ink film.

The receiving solution used in the receiving solution placing step may be in the same contents as those described in the section "B. Ink-set for ink-jet recording" above; thus, the descriptions herein are omitted.

Also, there are no particular limitations on the method for placing the receiving solution on the recording medium if it is a method in which the receiving solution can be placed on the recording medium before the printing step is conducted. Examples thereof may include a method using means such as a spray method, a coater method, an ink-jet method, a gravure method, and a flexo method.

In the present invention, among them, the forming method is preferably a method in which the receiving solution is placed on the recording medium using an ink-jet method. Thereby, it is easy to conduct the printing step before the solvent included in the receiving solution placed on the recording medium is completely dried, and the fixity of the ink composition film on the recording medium easily improves by facilitating the reaction of the multivalent metal salt included in the receiving solution with the ink composition.

Also, the point to place the receiving solution may be the point where the improvement in the fixity of the ink composition film ink-jet ejected in the printing step is possible; for example, it may be the whole surface of the recording medium, and may be in a pattern shape in which the ink composition of the recording medium overlaps with the point where the ink-jet is ejected in planar view. In more specific, in the present step, word printing is possible using means such as an ink-jet method as the method for placing the receiving solution, on the same point as the point where word printing of the ink composition is conducted in the printing step.

Incidentally, the amount of the receiving solution per a unit area placed on the recording medium can be appropriately set according to factors such as the kind of the receiving solution.

3. Method for Producing Printing of Present Invention

The printing produced by the method for producing a printing of the present invention includes a recording medium and an ink film formed by using the ink composition formed on the recording medium.

Also, the ink film formed on the recording medium is a dry film of the ink composition film formed by using the ink composition, which includes the solid content of the ink composition and the aqueous solvent thereof is dried and removed.

Incidentally, the solid content indicates all the components in the ink composition other than the aqueous solvent.

Incidentally, the present invention is not limited to the embodiments. The embodiments are exemplifications, and any other variations are intended to be included in the technical scope of the present invention if they have substantially the same constitution as the technical idea described in the claim of the present invention and offer similar operation and effect thereto.

EXAMPLES

The present invention is explained in further details with reference to Examples and Comparative Examples as follows.

1. Preparation of Ink Composition

According to the composition described in the below Tables 1 to 4, a pigment dispersion in which a pigment is dispersed as the coloring agent by a dispersing agent, the second resin emulsion, a silicon-acrylic resin emulsion, a surfactant, and a water-soluble organic solvent were mixed, water (ion exchanged water) was further added thereto so as the whole amount became 100 parts by mass, and filtrated the product by a membrane filter of 0.3 μm to obtain an ink composition (Examples 1 to 31, Comparative Examples 1 to 5, and Examples 32 to 37).

Incidentally, the numeric values for each component in Tables 1 to 4 indicates parts by mass. Also, the values for the pigment, the dispersing agent, the second resin emulsion, the silicon-acrylic resin emulsion, and the surfactant indicates parts by mass of the solid content in each component.

Also, the used pigment dispersion, second resin emulsion, silicon-acrylic resin emulsion, surfactant, and water-soluble organic solvent were as follows.

(1) Pigment Dispersion

The pigment dispersing resin was prepared by the below method.

A mixture of 63 g of methyl methacrylate, 27 g pf butyl acrylate, 30 g of butyl methacrylate, 15 g of acrylic acid, 15 g of methacrylic acid, and 3.6 g tert-butylperoxi-2-ethyl-hexanoate into 200 g of toluene kept 100° C. was dropped for 1.5 hours. After the dropping was completed, the product was brought into reaction for 2 hours at 100° C. and then cooled to obtain a resin solution. A resin was refined from the resin solution by hexane to obtain a pigment dispersing resin with molecular amount of 20000 and acid value of 143 mgKOH/g.

The obtained pigment dispersing resin of 2.5 g and N,N-dimethylaminoethanol of 0.6 g were dissolved in an ion exchanged water of 80 g, carbon black of 15.0 g and an antifoamer ("Sufynol 104PG" from Air Products and Chemicals, Inc.) of 0.05 g were added thereto, the product was dispersed by a paint shaker using zirconia beads to obtain pigment dispersion A-1.

As pigment dispersion A-2, a self-dispersing pigment dispersion Cab-O-Jet 400 (from Cabot Corporation.) was used.

As pigment dispersion A-3, a self-dispersing pigment dispersion SENSIJET ULTRA Black (from Sensient Technologies Corporation) was used.

Pigment dispersion A-4, A-5, and A-6 were obtained in the same manner as for pigment dispersion A-1 except that C.I. pigment yellow 155, C.I. pigment red 122, C.I. pigment blue 15:3 were respectively used instead of carbon black.

Incidentally, in pigment dispersion A-2 and A-3, the content of the hydrophilic group bonded to the surface of the pigment with respect to the pigment was very little amount in the level that might be ignored; thus, the descriptions of the blending amount of this hydrophilic group was omitted in Tables 1 to 4.

(2) Second Resin Emulsion

The inside of a flask provided with a machinery agitator, a thermometer, a nitrogen introducing tube, a reflux tube and a drop funnel was sufficiently replaced with nitrogen gas, and then 0.75 g of a reactive surfactant (product name: LATEMUL PD-104 from Kao Corporation.), 0.04 g of potassium persulfate, 6.0 g of methacrylic acid and 150 g of pure water were projected thereinto to be agitated and mixed at 25° C. The mixture of 111.0 g of methyl methacrylate, 18 g of 2-ethylhexyl acrylate and 15 g of butyl acrylate was dropped thereto to prepare a pre-emulsion. Also, the inside of a flask provided with a machinery agitator, a thermometer, a nitrogen introducing tube, a reflux tube and a drop funnel was sufficiently replaced with nitrogen gas, and then 3 g of a reactive surfactant (product name: LATEMUL PD-104 from Kao Corporation.), 0.01 g of potassium persulfate, and 200 g of pure water were agitated and mixed at 70° C. After that, the prepared pre-emulsion was dropped into the flask for 3 hours. The product was heated and matured at 70° C. for further 3 hours and then cooled down, the pH was adjusted to be 8 by N,N-dimethyl ethanolamine, filtrated by #150 mesh (from Japan Fabric) to obtain 500 g of second resin emulsion B-1 (solid content of 30 mass %, glass transition temperature of 64° C., acid value of 7 mgKOH/g, and average particle diameter of 120 nm).

As B-2, ACRIT WBR2101 (urethane resin emulsion from TAISEI FINE CHEMICAL CO., LTD.; average particle diameter of 60 nm, Tg of 40° C., and acid value of 40 mgKOH/g) was used.

As B-3, RIKABOND™ SU100 (urethane acrylic resin from Japan Coating Resin co., ltd.; average particle diameter of 84 nm, Tg of 48° C., and acid value of 16 mgKOH/g) was used.

As B-4, VINYBLAN™ 701NL50 (vinyl chloride acrylic resin from Nissin Chemical co., ltd.; average particle diameter of 70 nm, Tg of 57° C., and acid value of 50 mgKOH/g) was used.

As B-5, VINYBLAN™ 701 RL50 (vinyl chloride acrylic resin from Nissin Chemical co., ltd.; average particle diameter of 100 nm, Tg of 26° C., and acid value of 50 mgKOH/g) was used.

(3) Silicon-acrylic Resin Emulsion

In Tables 1 to 4, CHALINE LC190 (from Nissin Chemical co., ltd.; average particle diameter of 200 nm to 300 nm, Tg of 90° C. to 110° C., and ratio of acrylic structural unit/siloxane structural unit of 1/9) as silicon acrylic resin emulsion C-1, CHALINE FE 203N (from Nissin Chemical co., ltd.; average particle diameter of 200 nm to 300 nm, Tg of 50° C., and ratio of acrylic structural unit/siloxane structural unit of 5/5) as C2, MOWINYL 7110 (from Nissin Chemical co., ltd.; Tg of 30° C. and acid value of 15 mgKOH/g) as C3, and VONCOAT SA6360 (from DIC Corporation; average particle diameter of 150 nm and Tg of 21° C.) as C-4, were used.

The silicon content measured by an XRF measurement (wavelength dispersion type luminescent X-ray spectrometer LAB CENTER XRF-1800 from Shimadzu Corporation) was 20.0 mass % in C-1, 11.2 mass % in C-2, 2.0 mass % in C-3, and 0.1 mass % in C-4.

(4) Surfactant

In Tables 1 to 4, 8032 additive (polyether-modified polysiloxane-based from The Dow Chemical Company) as surfactant D-1, SILFACE SAG503A (polyether-modified polysiloxane-based from Nissin Chemical co., ltd.) as D-2, BYK3455 (polyether-modified polysiloxane-based from BYK) as D-3, TEGO Twin4200 (Gemini type polyether-modified polysiloxane-based from Evonik) as D-4, and OLFINE E1010 (polyether-modified acetylene-diol-based from Nissin Chemical co., ltd.) as D-5 were used.

(5) Water-soluble Organic Solvent

As the water-soluble organic solvent in Tables 1 to 4, propylene glycol (PG), 1,2-pentandiol (1,2-PD), 1,3-propanediol (1,3-PD), glycerin (Gly), 1,6-hexanediol (1,6-HD), and 3-methoxy-1-butanol (MB) were used.

Incidentally, among these water-soluble organic solvent, PG, 1,2-PD, 1,3-PD, and 1,6-HD are alkanediols.

2. Ink Film Property Evaluation

Evaluations of water resistance, solvent resistance, abrasion resistance, adherence, scratch resistance, drying properties, ejection stability, printing image quality (1), surface tension stability, and viscosity stability for the ink compositions obtained in Examples 1 to 31, Comparative Examples 1 to 5, and Examples 32 to 37 were conducted. The results are shown in the below Tables 1 to 4.

(1) Water Resistance

The ink compositions obtained in Examples and Comparative Examples were respectively filled into an ink-jet printer in which an ink-jet head having piezo element was installed under the environment of 25° C., solid printing with coverage rate of 100% was conducted to a polyvinyl chloride sheet (MD-5 from Metamark) while heating the sheet to 40° C., and the printing was dried for 5 minutes on a heater heated to 80° C.

Next, dry-treated ink film surface was rubbed with a rolling pin soaked in water to-and-fro for 10 times, and then the Lab value and the concentration (OD value) of the ink film surface were measured by a spectrophotometer (eXact advanced spectrophotometer from X-Rite Inc.) and the evaluations were conducted.

The evaluation basis was as follows; evaluations other than x are in the practicable range:

⊚: ΔE was less than 3 and the concentration change was less than 5%;

○: ΔE was 3 or more and less than 5 and the concentration change was 5% or more and less than 10%;

Δ: ΔE was 5 or more and less than 8 and the concentration change was 10% or more and less than 20%;

x: ΔE was 8 or more and the concentration change was 20% or more.

Measurement Conditions

Light source: D50

Viewing angle: 2°

Concentration status: ISO Status T

Filter: M1 (daylight)

Concentration white reference: absolute

Aperture: 4 mm

Calculation Method for ΔE

The Lab values of the ink film before and after the test were measured by a photometer and ΔE was calculated by the below equation:

$$\Delta E = ((a2-a1)^2 + (b2-b1)^2 + (L2-L1)^2)^{0.5}.$$

Incidentally, the values of a2, b2, and L2 are the Lab values after the test, and the values of a1, b1, and L1 are the Lab values before the test.

(2) Solvent Resistance

Printing was conducted with the ink composition obtained in Examples and Comparative Examples to the same recording medium and in the same printing conditions as in "(1) Water resistance" above, and drying thereof was conducted in the same drying conditions as in "(1) Water resistance" above.

Next, dry-treated ink film surface was rubbed with a rolling pin soaked in 40% ethanol (EtOH) aqueous solution to-and-fro for 10 times, and then the Lab value and the concentration (OD value) of the ink film surface were measured by a spectrophotometer (eXact advanced spectrophotometer from X-Rite Inc.) and the evaluations were conducted.

The evaluation basis was as follows; evaluations other than x are in the practicable range:

⊚: ΔE was less than 3 and the concentration change was less than 5%;

○: ΔE was 3 or more and less than 5 and the concentration change was 5% or more and less than 10%;

Δ: ΔE was 5 or more and less than 8 and the concentration change was 10% or more and less than 20%;

x: ΔE was 8 or more and the concentration change was 20% or more.

(3) Abrasion Resistance

Printing was conducted with the ink composition obtained in Examples and Comparative Examples to the same recording medium and in the same printing conditions as in "(1) Water resistance" above, and drying thereof was conducted in the same drying conditions as in "(1) Water resistance" above.

Next, a sample, in which dry-treated ink film surface was made contact with shirting 3 (cotton) in a state the load of 500 g applied, was moved to-and-fro for 100 times, was evaluated using Color Fastness Rubbing Tester (AB-301 from TESTER SANGYO CO., LTD.).

The evaluation basis was as follows; evaluations other than x are in the practicable range:

⊚: Not peeled off at all;

○: Peeled area in the ink film was less than 10% of the whole test area;

Δ: Peeled area in the ink film was less than 20% of the whole test area;

x: Peeled are in the ink film was 20% or more of the whole test area.

(4) Adherence

Printing was conducted with the ink composition obtained in Examples and Comparative Examples to the same recording medium and in the same printing conditions as in "(1) Water resistance" above, and drying thereof was conducted in the same drying conditions as in "(1) Water resistance" above.

Next, cellophane tape was pressed and adhered to dry-treated ink film surface and the state of the ink film when peeled off at 90° was visually evaluated.

The evaluation basis was as follows; evaluations other than x are in the practicable range:

⊚: Not peeled off at all;

○: Peeled area in the ink film was less than 10% of the whole test area;

Δ: Peeled area in the ink film was less than 20% of the whole test area;

x: Peeled are in the ink film was 20% or more of the whole test area.

(5) Scratch Resistance

Printing was conducted with the ink composition obtained in Examples and Comparative Examples to the same recording medium and in the same printing conditions as in "(1) Water resistance" above, and drying thereof was conducted in the same drying conditions as in "(1) Water resistance" above.

Next, dry-treated ink film surface was scratched with a nail, and the level of scratch in the ink film was visually evaluated.

The evaluation basis was as follows; evaluations ⊚ and ○ are in the practicable range:

⊚: None part was scratched at all;

○: A part of the ink film was scratched, but there was no peel-off of the ink film to the extent the surface of the substrate visually appears;

Δ: There were parts where the ink film was partially scratched;

x: The ink film was completely scratched off from the scratched part.

(6) Drying Properties

Printing was conducted with the ink composition obtained in Examples and Comparative Examples to the same recording medium and in the same printing conditions as in "(1) Water resistance" above.

Next, a drying treatment on a heater heated to 80° C. was conducted to the printing, the ink film was touched by a finger, and the drying time until when the ink composition did not adhere to the finger was measured, and the evaluation was conducted thereby.

The evaluation basis was as follows; evaluations other than x are in the practicable range:

⊚: The ink did not adhered to the finger touched to the ink film in 5 minutes;

○: The ink did not adhered to the finger touched to the ink film in 10 minutes;

Δ: The ink did not adhered to the finger touched to the ink film in 15 minutes;

x: The ink adhered to the finger touched to the ink film even after drying for 15 minutes or more.

(7) Ejecting Stability

Regarding the ink compositions obtained in Examples and Comparative Examples, the ink composition was ejected from all nozzles using an ink-jet head having a piezo element, and then nozzle patterns were printed after the carriage was brought into waiting state once to evaluate the number of nozzles having ejection failure and the reinstatement level of the ejection property through a cleaning step. Incidentally, for the cleaning, a cleaning solution with the composition of the ink composition in Example 1 excluding the pigment and the resin emulsion was used.

The evaluation basis was as follows; evaluations other than x are in the practicable range.

Incidentally, the cleaning step is an operation of wiping off the ink composition and air bubble adhered to a nozzle surface by hand using nonwoven fabric permeated with the cleaning solution.

⊚: Ejected normally from all the nozzles without conducting the cleaning step;

○: Ejected normally from all the nozzles by conducting the cleaning step once;

Δ: Ejected normally from all the nozzles by conducting the cleaning step twice or more;

x: Ejecting properties of all the nozzles were not reinstated even by conducting the cleaning step twice or more.

(8) Printing Image Quality A

Printing was conducted with the ink composition obtained in Examples and Comparative Examples to the same substrate and in the same printing conditions as in "(1) Water resistance" above, and drying thereof was conducted in the same drying conditions as in "(1) Water resistance" above.

Next, the state of the ink film after the drying treatment was visually evaluated.

The evaluation basis was as follows; evaluations other than x are in the practicable range:

⊚: Uniform and smooth ink film without cissing and nonuniformity;

○: Partial nonuniformity was present;

Δ: Partial nonuniformity and pinholes were present;

x: Cissing and nonuniformity were remarkable and the ink film was not formed.

(9) Surface Tension Stability

The ink compositions obtained in Examples and Comparative Examples were kept in a thermostat at 60° C. for 10 days, and the change rate of the surface tension from before the keeping for 10 days was initiated to after the keeping completed was measured and evaluated.

Incidentally, the measurement of the surface tension was conducted using a plate type surface tension meter (CBVP-Z from Kyowa Interface Science, Inc.) under the environment of 25° C. ±0.5° C.

The evaluation basis was as follows; evaluations other than x are in the practicable range:

⊚: The change rate was less than 3%;

○: The change rate was less than 5%;

Δ: The change rate was less than 10%;

x: The change rate was 10% or more.

(10) Viscosity Stability

The ink compositions obtained in Examples and Comparative Examples were kept in a thermostat at 60° C. for 10 days, and the change rate of the viscosity from before the keeping for 10 days was initiated to after the keeping completed was measured and evaluated.

Incidentally, the measurement of the viscosity was conducted using a falling ball type viscometer (AMVn from Anton Paar GmbH) under the environment of 25° C.

The evaluation basis was as follows; evaluations other than x are in the practicable range:

⊚: The change rate was less than 3%;

○: The change rate was less than 5%;

Δ: The change rate was less than 10%;

x: The change rate was 10% or more.

TABLE 1

| Ink composition | | Examples | | | | | | | |
|---|---|---|---|---|---|---|---|---|---|
| Category | Reference | 1 | 2 | 3 | 4 | 5 | 6 | 7 | 8 |
| Pigment | A-1 | 3.00 | 3.00 | 3.00 | — | — | 3.00 | 3.00 | 3.00 |
|  | A-2 | — | — | — | 3.00 | — | — | — | — |
|  | A-3 | — | — | — | — | 3.00 | — | — | — |
|  | A-4 | — | — | — | — | — | — | — | — |
|  | A-5 | — | — | — | — | — | — | — | — |
|  | A-6 | — | — | — | — | — | — | — | — |
| Dipersion |  | 0.50 | 0.50 | 0.50 | — | — | 0.50 | 0.50 | 0.50 |
| Second resin emulsion | B-1 | 6.00 | 6.00 | 6.00 | 6.00 | 6.00 | — | — | — |
|  | B-2 | — | — | — | — | — | 6.00 | — | — |
|  | B-3 | — | — | — | — | — | — | 6.00 | — |
|  | B-4 | — | — | — | — | — | — | — | 6.00 |
|  | B-5 | — | — | — | — | — | — | — | — |
| Silicon acrylic resin emulsion | C-1 | 1.00 | 0.30 | 5.00 | 0.40 | 0.40 | 0.40 | 0.40 | 0.40 |
|  | C-2 | — | — | — | — | — | — | — | — |
|  | C-3 | — | — | — | — | — | — | — | — |
|  | C-4 | — | — | — | — | — | — | — | — |
| Surfactant | D-1 | 0.50 | 0.50 | 0.50 | 0.50 | 0.50 | 0.50 | 0.50 | 0.50 |
|  | D-2 | — | — | — | — | — | — | — | — |
|  | D-3 | — | — | — | — | — | — | — | — |
|  | D-4 | — | — | — | — | — | — | — | — |
|  | D-5 | — | — | — | — | — | — | — | — |

TABLE 1-continued

| Aqueous solvent | PG | 44.00 | 45.00 | 42.00 | 44.00 | 43.00 | 40.00 | 43.00 | 42.00 |
|---|---|---|---|---|---|---|---|---|---|
| | 1,2-PD | — | — | — | — | — | — | — | — |
| | 1,3-PD | — | — | — | — | — | — | — | — |
| | Gly | — | — | — | — | — | — | — | — |
| | 1,6-HD | — | — | — | — | — | — | — | — |
| | MB | — | — | — | — | — | — | — | — |
| | Ion exchanged water | 45.00 | 44.70 | 43.00 | 46.10 | 47.10 | 49.60 | 46.60 | 47.60 |
| Total | | 100.00 | 100.00 | 100.00 | 100.00 | 100.00 | 100.00 | 100.00 | 100.00 |
| Resin emulsion/coloring agent | | 2.33 | 2.10 | 3.67 | 2.13 | 2.13 | 2.13 | 2.13 | 2.13 |
| Silicon acrylic resin emulsion/coloring agent | | 0.33 | 0.10 | 1.67 | 0.13 | 0.13 | 0.13 | 0.13 | 0.13 |
| Silicon acrylic resin em./second resin em. | | 0.17 | 0.05 | 0.83 | 0.07 | 0.07 | 0.07 | 0.07 | 0.07 |
| Evaluation | Water resistance | ⊚ | ⊚ | ⊚ | ○ | ○ | ⊚ | ⊚ | ⊚ |
| | Solvent resistance | ⊚ | ⊚ | ○ | △ | △ | ⊚ | ⊚ | ○ |
| | Abrasion resistance | ⊚ | ⊚ | ⊚ | ○ | ⊚ | ⊚ | ⊚ | ○ |
| | Adherence | ⊚ | ⊚ | ○ | ⊚ | ⊚ | ⊚ | ⊚ | ⊚ |
| | Scratch resistance | ⊚ | ○ | ○ | ⊚ | ⊚ | ⊚ | ⊚ | ⊚ |
| | Drying properties | ⊚ | ⊚ | ⊚ | ⊚ | ⊚ | ⊚ | ⊚ | ⊚ |
| | Ejection stability | ⊚ | ⊚ | ○ | ○ | ○ | ○ | ○ | ○ |
| | Printing image quality A | ⊚ | ⊚ | ○ | ⊚ | ⊚ | ⊚ | ⊚ | ⊚ |
| | Surface tension stability | ⊚ | ⊚ | ○ | ⊚ | ⊚ | ⊚ | ⊚ | ⊚ |
| | Viscosity stability | ⊚ | ⊚ | ○ | ⊚ | ⊚ | ⊚ | ⊚ | ○ |

| Ink composition | | Examples | | | | | | |
|---|---|---|---|---|---|---|---|---|
| Category | Reference | 9 | 10 | 11 | 12 | 13 | 14 | 15 |
| Pigment | A-1 | 3.00 | 3.00 | 3.00 | 3.00 | 3.00 | 3.00 | 3.00 |
| | A-2 | — | — | — | — | — | — | — |
| | A-3 | — | — | — | — | — | — | — |
| | A-4 | — | — | — | — | — | — | — |
| | A-5 | — | — | — | — | — | — | — |
| | A-6 | — | — | — | — | — | — | — |
| | Dipersion | 0.50 | 0.50 | 0.50 | 0.50 | 0.50 | 0.50 | 0.50 |
| Second resin emulsion | B-1 | 6.00 | 6.00 | 6.00 | 6.00 | 6.00 | — | 6.00 |
| | B-2 | — | — | — | — | — | — | — |
| | B-3 | — | — | — | — | — | — | — |
| | B-4 | — | — | — | — | — | — | — |
| | B-5 | — | — | — | — | — | 6.00 | — |
| Silicon acrylic resin emulsion | C-1 | — | 0.40 | 0.40 | 0.40 | 0.40 | 0.40 | 0.40 |
| | C-2 | 1.00 | — | — | — | — | — | — |
| | C-3 | — | — | — | — | — | — | — |
| | C-4 | — | — | — | — | — | — | — |
| Surfactant | D-1 | 0.50 | 0.50 | 0.50 | — | — | 0.50 | 0.50 |
| | D-2 | — | — | — | 0.50 | — | — | — |
| | D-3 | — | — | — | — | 0.50 | — | — |
| | D-4 | — | — | — | — | — | — | — |
| | D-5 | — | — | — | — | — | — | — |
| Aqueous solvent | PG | 44.00 | — | 22.00 | 44.00 | 44.00 | 42.00 | 41.00 |
| | 1,2-PD | — | — | 22.00 | — | — | — | — |
| | 1,3-PD | — | 44.00 | — | — | — | — | — |
| | Gly | — | — | — | — | — | — | 3.00 |
| | 1,6-HD | — | — | — | — | — | — | — |
| | MB | — | — | — | — | — | — | — |
| | Ion exchanged water | 45.00 | 45.60 | 45.60 | 45.60 | 45.60 | 47.60 | 45.60 |
| Total | | 100.00 | 100.00 | 100.00 | 100.00 | 100.00 | 100.00 | 100.00 |
| Resin emulsion/coloring agent | | 2.33 | 2.13 | 2.13 | 2.13 | 2.13 | 2.13 | 2.13 |

TABLE 1-continued

|  |  |  |  |  |  |  |  |  |
|---|---|---|---|---|---|---|---|---|
| Silicon acrylic resin emulsion/coloring agent | | 0.33 | 0.13 | 0.13 | 0.13 | 0.13 | 0.13 | 0.13 |
| Silicon acrylic resin em./second resin em. | | 0.17 | 0.07 | 0.07 | 0.07 | 0.07 | 0.07 | 0.07 |
| Evaluation | Water resistance | ◎ | ◎ | ◎ | ◎ | ◎ | ○ | ○ |
| | Solvent resistance | ○ | ◎ | ◎ | ◎ | ◎ | △ | △ |
| | Abrasion resistance | ◎ | ◎ | ◎ | ◎ | ◎ | △ | △ |
| | Adherence | ◎ | ◎ | ◎ | ◎ | ◎ | △ | △ |
| | Scratch resistance | ◎ | ◎ | ◎ | ◎ | ◎ | ○ | △ |
| | Drying properties | ◎ | ○ | ○ | ◎ | ◎ | ◎ | △ |
| | Ejection stability | ◎ | ◎ | ◎ | ◎ | ◎ | △ | ○ |
| | Printing image quality A | ◎ | ○ | ○ | ○ | ○ | ○ | ○ |
| | Surface tension stability | ○ | ○ | ○ | ○ | ◎ | ○ | ○ |
| | Viscosity stability | ○ | ○ | ○ | ○ | ◎ | ○ | ○ |

TABLE 2

| Ink composition | | Examples | | | | | | | | |
|---|---|---|---|---|---|---|---|---|---|---|
| Category | Reference | 16 | 17 | 18 | 19 | 20 | 21 | 22 | 23 | 24 |
| Pigment | A-1 | 3.00 | 3.00 | 3.00 | 3.00 | 3.00 | — | — | — | 3.00 |
| | A-2 | — | — | — | — | — | — | — | — | — |
| | A-3 | — | — | — | — | — | — | — | — | — |
| | A-4 | — | — | — | — | — | 3.00 | — | — | — |
| | A-5 | — | — | — | — | — | — | 3.00 | — | — |
| | A-6 | — | — | — | — | — | — | — | 2.40 | — |
| Dispersion | | 0.50 | 0.50 | 0.50 | 0.50 | 0.50 | 0.50 | 0.50 | 0.40 | 0.50 |
| Second resin emulsion | B-1 | 6.00 | 6.00 | 6.00 | 6.00 | 6.00 | 6.00 | 6.00 | 6.00 | 3.60 |
| | B-2 | — | — | — | — | — | — | — | — | — |
| | B-3 | — | — | — | — | — | — | — | — | — |
| | B-4 | — | — | — | — | — | — | — | — | — |
| | B-5 | — | — | — | — | — | — | — | — | — |
| Silicon acrylic resin emulsion | C-1 | 0.40 | 0.40 | — | — | 1.00 | 1.00 | 1.00 | 1.00 | 0.40 |
| | C-2 | — | — | — | — | — | — | — | — | — |
| | C-3 | — | — | 1.00 | — | — | — | — | — | — |
| | C-4 | — | — | — | 1.00 | — | — | — | — | — |
| Surfactant | D-1 | — | — | 0.50 | 0.50 | 0.25 | 0.50 | 0.50 | 0.50 | 0.50 |
| | D-2 | — | — | — | — | — | — | — | — | — |
| | D-3 | — | — | — | — | — | — | — | — | — |
| | D-4 | 0.50 | — | — | — | — | — | — | — | — |
| | D-5 | — | 0.50 | — | — | 0.25 | — | — | — | — |
| Aqueous solvent | PG | 44.00 | 44.00 | 44.00 | 44.00 | 44.00 | 44.00 | 44.00 | 45.00 | 45.00 |
| | 1,2-PD | — | — | — | — | — | — | — | — | — |
| | 1,3-PD | — | — | — | — | — | — | — | — | — |
| | Gly | — | — | — | — | — | — | — | — | — |
| | 1,6-HD | — | — | — | — | — | — | — | — | — |
| | MB | — | — | — | — | — | — | — | — | — |
| | Ion exchanged water | 45.60 | 45.60 | 45.00 | 45.00 | 45.00 | 45.00 | 45.00 | 44.70 | 47.00 |
| Total | | 100.0 | 100.0 | 100.0 | 100.0 | 100.0 | 100.0 | 100.0 | 100.0 | 100.0 |
| Resin emulsion/coloring agent | | 2.13 | 2.13 | 2.33 | 2.33 | 2.33 | 2.33 | 2.33 | 2.92 | 1.33 |
| Silicon acrylic resin emulsion/coloring agent | | 0.13 | 0.13 | 0.33 | 0.33 | 0.33 | 0.33 | 0.33 | 0.42 | 0.13 |
| Silicon acrylic resin em./second resin em. | | 0.07 | 0.07 | 0.17 | 0.17 | 0.17 | 0.17 | 0.17 | 0.17 | 0.11 |

TABLE 2-continued

| Evaluation | | | | | | | | | | |
|---|---|---|---|---|---|---|---|---|---|---|
| | Water resistance | ◉ | ◉ | ◉ | ◉ | ◉ | ◉ | ◉ | ◉ | ◉ |
| | Solvent resistance | ○ | ◉ | ○ | ○ | ◉ | ◉ | ◉ | ◉ | ○ |
| | Abrasion resistance | ◉ | ◉ | ○ | ○ | ◉ | ◉ | ◉ | ◉ | ○ |
| | Adherence | ◉ | ◉ | ○ | ○ | ◉ | ◉ | ◉ | ◉ | ○ |
| | Scratch resistance | ◉ | ◉ | ○ | ○ | ◉ | ◉ | ◉ | ◉ | ○ |
| | Drying properties | ◉ | ○ | ◉ | ◉ | ◉ | ◉ | ◉ | ◉ | ◉ |
| | Ejection stability | ○ | ○ | ○ | ○ | ◉ | ◉ | ◉ | ◉ | ◉ |
| | Printing image quality A | ○ | ○ | ○ | ○ | ◉ | ◉ | ◉ | ◉ | ○ |
| | Surface tension stability | ○ | Δ | ○ | ○ | ○ | ◉ | ◉ | ◉ | ◉ |
| | Viscosity stability | ○ | Δ | ○ | ○ | ○ | ◉ | ◉ | ◉ | ◉ |

| Ink composition | | Examples | | | | | | |
|---|---|---|---|---|---|---|---|---|
| Category | Reference | 25 | 26 | 27 | 28 | 29 | 30 | 31 |
| Pigment | A-1 | 3.00 | — | 6.00 | 3.00 | — | — | 1.00 |
| | A-2 | — | — | — | — | — | — | — |
| | A-3 | — | — | — | — | — | — | — |
| | A-4 | — | — | — | — | — | — | — |
| | A-5 | — | 0.75 | — | — | 0.75 | 3.00 | — |
| | A-6 | — | — | — | — | — | — | — |
| Dispersion | | 0.50 | 0.13 | 1.00 | 0.50 | 0.13 | 0.50 | 0.17 |
| Second resin emulsion | B-1 | 11.60 | 8.25 | 12.00 | 6.00 | 8.25 | 2.00 | 6.00 |
| | B-2 | — | — | — | — | — | — | — |
| | B-3 | — | — | — | — | — | — | — |
| | B-4 | — | — | — | — | — | — | — |
| | B-5 | — | — | — | — | — | — | — |
| Silicon acrylic resin emulsion | C-1 | 0.30 | 0.40 | 0.80 | 0.40 | 2.00 | 0.60 | 3.00 |
| | C-2 | — | — | — | — | — | — | — |
| | C-3 | — | — | — | — | — | — | — |
| | C-4 | — | — | — | — | — | — | — |
| Surfactant | D-1 | 0.50 | 0.50 | 0.50 | 0.50 | 0.50 | 0.50 | 0.50 |
| | D-2 | — | — | — | — | — | — | — |
| | D-3 | — | — | — | — | — | — | — |
| | D-4 | — | — | — | — | — | — | — |
| | D-5 | — | — | — | — | — | — | — |
| Aqueous solvent | PG | 38.00 | 45.00 | 30.00 | 36.00 | 42.00 | 50.00 | 42.00 |
| | 1,2-PD | — | — | — | — | — | — | — |
| | 1,3-PD | — | — | — | — | — | — | — |
| | Gly | — | — | — | — | — | — | — |
| | 1,6-HD | — | — | — | 3.00 | — | — | — |
| | MB | — | — | — | 3.00 | — | — | — |
| | Ion exchanged water | 46.10 | 44.97 | 49.70 | 47.60 | 46.37 | 43.40 | 47.33 |
| Total | | 100.0 | 100.0 | 100.0 | 100.0 | 100.0 | 100.0 | 100.0 |
| Resin emulsion/coloring agent | | 3.97 | 11.53 | 2.13 | 2.13 | 13.67 | 0.87 | 9.00 |
| Silicon acrylic resin emulsion/coloring agent | | 0.10 | 0.53 | 0.13 | 0.13 | 2.67 | 0.20 | 3.00 |
| Silicon acrylic resin em./second resin em. | | 0.03 | 0.05 | 0.07 | 0.07 | 0.24 | 0.30 | 0.50 |
| Evaluation | Water resistance | ◉ | ◉ | ◉ | ◉ | ○ | ○ | ◉ |
| | Solvent resistance | ◉ | ◉ | ◉ | ○ | ○ | ○ | ○ |
| | Abrasion resistance | ◉ | ◉ | ◉ | ○ | ◉ | Δ | ◉ |
| | Adherence | ◉ | ◉ | ◉ | ○ | ◉ | Δ | ○ |
| | Scratch resistance | Δ | ◉ | ◉ | ○ | ◉ | ○ | ◉ |
| | Drying properties | ◉ | ◉ | ◉ | ○ | ◉ | ◉ | ○ |
| | Ejection stability | Δ | ◉ | Δ | ○ | ○ | ◉ | Δ |

TABLE 2-continued

|  |  |  |  |  |  |  |  |  |
|---|---|---|---|---|---|---|---|---|
| Printing image quality A | ○ | ◉ | ◉ | ○ | ○ | ◉ | ◉ |
| Surface tension stability | ○ | ◉ | ○ | ○ | ◉ | ◉ | ◉ |
| Viscosity stability | ○ | ◉ | ○ | ○ | ◉ | ◉ | ◉ |

TABLE 3

| Ink composition | | Comparative Examples | | | | |
|---|---|---|---|---|---|---|
| Category | Reference | 1 | 2 | 3 | 4 | 5 |
| Pigment | A-1 | 100 | 3.00 | 3.00 | 6.00 | 0.75 |
|  | A-2 | — | — | — | — | — |
|  | A-3 | — | — | — | — | — |
|  | A-4 | — | — | — | — | — |
|  | A-5 | — | — | — | — | — |
|  | A-6 | — | — | — | — | — |
|  | Dispersion | 0.50 | 0.50 | 0.50 | 1.00 | 0.13 |
| Second resin emulsion | B-1 | 6.00 | 6.00 | 0.00 | 0.00 | 8.25 |
|  | B-2 | — | — | — | — | — |
|  | B-3 | — | — | — | — | — |
|  | B-4 | — | — | — | — | — |
|  | B-5 | — | — | — | — | — |
| Silicon acrylic resin emulsion | C-1 | 0.00 | 0.10 | 20.00 | 1.00 | 4.00 |
|  | C-2 | — | — | — | — | — |
|  | C-3 | — | — | — | — | — |
|  | C-4 | — | — | — | — | — |
| Surfactant | D-1 | 0.50 | 0.50 | 0.50 | 0.50 | 0.50 |
|  | D-2 | — | — | — | — | — |
|  | D-3 | — | — | — | — | — |
|  | D-4 | — | — | — | — | — |
|  | D-5 | — | — | — | — | — |
| Aqueous solvent | PG | 45.20 | 44.50 | 42.00 | 45.00 | 38.00 |
|  | 1,2-PD | — | — | — | — | — |
|  | 1,3-PD | — | — | — | — | — |
|  | Gly | — | — | — | — | — |
|  | 1,6-HD | — | — | — | — | — |
|  | MB | — | — | — | — | — |

TABLE 3-continued

| Ink composition | | Comparative Examples | | | | |
|---|---|---|---|---|---|---|
| Category | Reference | 1 | 2 | 3 | 4 | 5 |
|  | Ion exchanged water | 44.80 | 45.40 | 34.00 | 46.50 | 48.37 |
|  | Total | 100.0 | 100.0 | 100.0 | 100.0 | 100.0 |
|  | Resin emulsion/coloring agent | 2.00 | 2.03 | 6.67 | 0.17 | 16.33 |
|  | Silicon acrylic resin emulsion/coloring agent | 0.00 | 0.03 | 6.67 | 0.17 | 5.33 |
|  | Silicon acrylic resin em./second resin em. | 0.00 | 0.017 | — | — | 0.48 |
| Evaluation | Water resistance | ◉ | ◉ | X | X | X |
|  | Solvent resistance | ◉ | ◉ | X | X | X |
|  | Abrasion resistance | ◉ | ◉ | X | X | X |
|  | Adherence | ◉ | ◉ | X | X | X |
|  | Scratch resistance | X | X | X | X | X |
|  | Drying properties | ◉ | ◉ | Δ | ◉ | ○ |
|  | Ejection stability | ◉ | ◉ | X | ○ | X |
|  | Printing image quality A | ◉ | ◉ | X | X | X |
|  | Surface tension stability | ◉ | ◉ | X | ◉ | Δ |
|  | Viscosity stability | ◉ | ◉ | Δ | ◉ | Δ |

TABLE 4

| Ink composition | | Examples | | | | | |
|---|---|---|---|---|---|---|---|
| Category | Reference | 32 | 33 | 34 | 35 | 36 | 37 |
| Pigment | A-1 | 3.00 | 3.00 | 3.00 | 3.00 | 3.00 | 3.00 |
|  | A-2 | — | — | — | — | — | — |
|  | A-3 | — | — | — | — | — | — |
|  | A-4 | — | — | — | — | — | — |
|  | A-5 | — | — | — | — | — | — |
|  | A-6 | — | — | — | — | — | — |
|  | Dispersion | 0.50 | 0.50 | 0.50 | 0.50 | 0.50 | 0.50 |
| Second resin emulsion | B-1 | 6.00 | 6.00 | 6.00 | 6.00 | 6.00 | 6.00 |
|  | B-2 | — | — | — | — | — | — |
|  | B-3 | — | — | — | — | — | — |
|  | B-4 | — | — | — | — | — | — |
|  | B-5 | — | — | — | — | — | — |
| Silicon acrylic resin emulsion | C-1 | 1.00 | 0.30 | 1.00 | 0.30 | 1.00 | 0.30 |
|  | C-2 | — | — | — | — | — | — |
|  | C-3 | — | — | — | — | — | — |
|  | C-4 | — | — | — | — | — | — |
| Surfactant | D-1 | 0.50 | 0.50 | 0.50 | 0.50 | 0.50 | 0.50 |
|  | D-2 | — | — | — | — | — | — |
|  | D-3 | — | — | — | — | — | — |
|  | D-4 | — | — | — | — | — | — |
|  | D-5 | — | — | — | — | — | — |

TABLE 4-continued

| Ink composition | | Examples | | | | | |
|---|---|---|---|---|---|---|---|
| Category | Reference | 32 | 33 | 34 | 35 | 36 | 37 |
| Aqueous solvent | PG | 55.00 | 55.00 | 40.00 | 40.00 | 25.00 | 25.00 |
| | 1,2-PD | — | — | — | — | — | — |
| | 1,3-PD | — | — | — | — | — | — |
| | Gly | — | — | — | — | — | — |
| | 1,6-HD | — | — | — | — | — | — |
| | MB | — | — | 12.00 | 12.00 | — | — |
| | Ion exchanged water | 34.00 | 34.70 | 37.00 | 37.70 | 64.00 | 64.70 |
| | Total | 100.0 | 100.0 | 100.0 | 100.0 | 100.0 | 100.0 |
| Resin emulsion/coloring agent | | 2.33 | 2.10 | 2.33 | 2.10 | 2.33 | 2.10 |
| Silicon acrylic resin emulsion/coloring agent | | 0.33 | 0.10 | 0.33 | 0.10 | 0.33 | 0.10 |
| Silicon acrylic resin em./second resin em. | | 0.17 | 0.05 | 0.17 | 0.05 | 0.17 | 0.05 |
| Evaluation | Water resistance | ◎ | ◎ | ◎ | ◎ | ◎ | ◎ |
| | Solvent resistance | ○ | ◎ | ○ | ◎ | ○ | ◎ |
| | Abrasion resistance | ◎ | ◎ | ◎ | ◎ | ◎ | ◎ |
| | Adherence | ◎ | ◎ | ◎ | ◎ | ◎ | ◎ |
| | Scratch resistance | ◎ | ○ | ◎ | ○ | ◎ | ○ |
| | Drying properties | △ | △ | ○ | ○ | ◎ | ◎ |
| | Ejection stability | ◎ | ◎ | ◎ | ◎ | △ | △ |
| | Printing image quality A | ○ | ○ | ◎ | ◎ | ○ | ○ |
| | Surface tension stability | ○ | ○ | ○ | ○ | ◎ | ◎ |
| | Viscosity stability | ◎ | ◎ | △ | ○ | ◎ | ◎ |

3. Summary

From Table 1 to Table 4, in Examples, the ink film with all four properties of adherence, solvent resistance, abrasion resistance, and water resistance in the practicable region as well as scratch resistance in the practicable region was obtained. In this manner, it was confirmed that the ink film excellent in film strength as well as in scratch resistance was formed in Examples.

Also, from the comparison of Example 2 to Examples such as Example 15, it was confirmed that the ink film became excellent in drying properties by using just the one having a boiling point of less than 280° C. as the water-soluble organic solvent.

Also, from Table 1 to Table 4, for example from the comparison of Example 1 to Examples such as Examples 32 to 37, it was confirmed that the content of the water-soluble organic solvent being 60 mass % or less allowed the ink composition to easily obtain an ink film excellent in drying properties. In other words, it was confirmed that the content in the above described range allowed the ink composition to easily form an ink film excellent in both film strength and scratch resistance as well as in drying properties.

4. Receiving Solution Effect Evaluation

Whether the presence of the receiving solution affected was confirmed.

In specific, the receiving solution was printed by the following method, and then onto where the receiving solution was printed, a printing in which the ink in combination of the ink compositions of Examples 1, 21, 22, and 23 (the ink containing dispersion A-1 of carbon black, dispersion A-4 of C.I. pigment yellow 155, dispersion A-5 of C.I. pigment red 122, and dispersion A-6 of C.I. pigment blue 15:3) was formed, and the tests for abrasion resistance, drying properties, solvent resistance, printing image quality B and printing image quality C on the printing were conducted. The results are shown in the below Table 5.

Also, the printing in which the receiving solution was not printed was fabricated to conduct the evaluation in the same manner. The results are shown in the below Table 5.

Incidentally, in Table 5, condition "a" is the evaluation result without printing of receiving solution, and condition "b" is the evaluation result with printing of receiving solution.

Also, the evaluation method used for abrasion resistance, drying properties, and solvent resistance was the same as the method described in the sections "(3) Abrasion resistance", "(6) Drying properties", and "(2) Solvent resistance" in "2. Ink film property evaluation" above.

Printing image quality B and C were evaluated by the method shown below.

Preparation of Receiving Solution

A receiving solution was obtained by blending 1.7 parts by mass of magnesium propionate, 33.0 parts by mass of 1,2-pentandiol, 0.5 parts by mass of SILFACE SAG503A (surface tension adjuster from Nissin Chemical co., ltd.), 4.0 parts by mass (converted to solid content) of SUPER FLEX620 (acrylic resin emulsion from TAISEI FINE CHEMICAL CO., LTD.), and 60.8 parts by mass of ion exchanged water.

Method for Producing Printing

The receiving solution prepared by the above described method was filled into an ink-jet printer in which an ink-jet head having piezo element was installed in the same manner as in "(1) Water resistance" above, the same image as the image to be printed with the ink composition was printed to a polyvinyl chloride sheet (MD-5 from Metamark), and then the ink composition was printed onto where the receiving solution was printed in the same manner as in "(1) Water resistance" above, to obtain a printing.

Incidentally, the printing of the ink composition was conducted in the manner the surface temperature of the recorded medium upon the impact of the ink composition became 40° C. Also, the printing was dried so as the surface temperature thereof became 80° C.

(1) Printing Image Quality B

Word-printing was conducted with the ink compositions in Examples 1, 21, 22, and 23 with a single color and 12 pt, and the bleeding of the word was evaluated. The results of evaluation are shown in Table 5.

The evaluation basis was as follows; evaluations other than x are in the practicable range:
⊚: Bleeding was not confirmed; image was clear;
○: Bleeding was slightly confirmed, but the image was clear;
Δ: Bleeding was confirmed and the clearance was slightly inferior;
x: Bleeding was clearly confirmed, and the clearance was inferior.

(2) Printing Image Quality C

Word-printing was conducted with the ink compositions in Examples 1, 21, 22, and 23 so as 100% solid part of single color in each colored ink became adjacent to each other, and the bleeding in the border part between each color was evaluated. The evaluation results are shown in Table 5.

The evaluation basis was as follows; evaluations other than x are in the practicable range:
⊚: Bleeding was not confirmed; image was clear;
○: Bleeding was slightly confirmed, but the image was clear;
Δ: Bleeding was confirmed and the clearance in the border of colors was partially not clear;
x: Bleeding was clearly confirmed, and the clearance was inferior.

TABLE 5

| Condition | Evaluation | Example 1 | Example 21 | Example 22 | Example 23 |
|---|---|---|---|---|---|
| a | Abrasion resistance | ⊚ | ⊚ | ⊚ | ⊚ |
|   | Drying properties | ⊚ | ⊚ | ⊚ | ⊚ |
|   | Solvent resistance | ⊚ | ⊚ | ⊚ | ⊚ |
|   | Printing image quality B | ○ | ○ | ○ | ○ |
|   | Printing image quality C | ○ | ○ | ○ | ○ |
| b | Abrasion resistance | ⊚ | ⊚ | ⊚ | ⊚ |
|   | Drying properties | ⊚ | ⊚ | ⊚ | ⊚ |
|   | Solvent resistance | ⊚ | ⊚ | ⊚ | ⊚ |
|   | Printing image quality B | ⊚ | ⊚ | ⊚ | ⊚ |
|   | Printing image quality C | ⊚ | ⊚ | ⊚ | ⊚ |

(3) Summary

According to Table 5, in the printing with the printing of receiving solution, compared to the printing without the printing of receiving solution, bleeding was not confirmed in evaluations of printing image quality B and printing image quality C in particular, and favorable results were obtained.

Therefore, it was confirmed that the ink-jet recording method including the receiving solution placing step and the printing step of the present invention was an excellent ink-jet recording method.

The invention claimed is:

1. An ink composition for ink-jet recording comprising:
    an aqueous solvent including water and water-soluble organic solvent;
    a coloring agent;
    a resin emulsion; and
    a surfactant; wherein
    the resin emulsion includes a silicon-acrylic resin emulsion and a resin emulsion other than the silicon-acrylic resin emulsion;
    a content ratio of the resin emulsion to the coloring agent (content of the resin emulsion/content of the coloring agent) is 1/5 or more and 15/1 or less;
    a content ratio of the silicon-acrylic resin emulsion to the coloring agent (content of the silicon-acrylic resin emulsion/content of the coloring agent) is 1/20 or more and 5/1 or less; and
    a content ratio of the silicon-acrylic resin emulsion to the resin emulsion other than the silicon-acrylic resin emulsion (content of the silicon-acrylic resin emulsion/content of the resin emulsion other than the silicon-acrylic resin emulsion) is 1/50 or more and 1/2 or less.

2. The ink composition for ink-jet recording according to claim 1, wherein a content of the water-soluble organic solvent is 80% by mass or less.

3. The ink composition for ink-jet recording according to claim 1, wherein a content of a water-soluble organic solvent with a boiling point of 240° C. or more in the ink composition is 5% by mass or less.

4. The ink composition for ink-jet recording according to claim 1, wherein the resin emulsion other than the silicon-acrylic resin emulsion includes at least one kind of an acrylic resin, an urethane resin, an urethane-acrylic resin, a polyester resin, an acrylic polyester resin, a styrene acrylic resin, and an acrylic-vinyl chloride resin.

5. The ink composition for ink-jet recording according to claim 1, wherein the water-soluble organic solvent includes alkanediols.

6. An ink-set for ink-jet recording comprising:
    the ink composition for ink-jet recording according to claim 1; and
    a receiving solution containing a multivalent metal salt.

7. An ink cartridge comprising:
    a container for ink; and
    an ink composition stored in the container for ink; wherein
    the ink composition is the ink composition for ink-jet recording according to claim 1.

8. A method for producing a printing comprising a printing step of ejecting the ink composition for ink-jet recording according to claim 1 by an ink-jet method.

* * * * *